(12) United States Patent
Phillips et al.

(10) Patent No.: US 7,630,109 B2
(45) Date of Patent: Dec. 8, 2009

(54) COVERT SECURITY COATING

(75) Inventors: Roger W. Phillips, Santa Rosa, CA (US); Roy Bie, Rohnert Park, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 409 days.

(21) Appl. No.: 11/424,033

(22) Filed: Jun. 14, 2006

(65) Prior Publication Data
US 2006/0285184 A1 Dec. 21, 2006

Related U.S. Application Data

(60) Provisional application No. 60/691,499, filed on Jun. 17, 2005.

(51) Int. Cl.
G03H 1/00 (2006.01)
G02B 5/18 (2006.01)
(52) U.S. Cl. ............................... 359/2; 359/567; 283/91
(58) Field of Classification Search .................... 359/2, 359/567; 283/85, 87, 91
See application file for complete search history.

(56) References Cited

U.S. PATENT DOCUMENTS

| | | | |
|---|---|---|---|
| 3,011,383 A | 12/1961 | Sylvester et al. | 359/584 |
| 4,066,280 A | 1/1978 | LaCapria | 283/91 |
| 4,126,373 A | 11/1978 | Moraw | 359/2 |
| 4,155,627 A | 5/1979 | Gale et al. | 359/568 |
| 4,168,983 A | 9/1979 | Vittands et al. | 106/14.12 |
| 4,434,010 A | 2/1984 | Ash | 106/415 |
| 4,705,300 A | 11/1987 | Berning et al. | 283/91 |
| 4,705,356 A | 11/1987 | Berning et al. | 359/590 |
| 4,721,217 A | 1/1988 | Phillips et al. | 215/230 |
| 4,756,771 A | 7/1988 | Brodalla et al. | 148/244 |
| 4,779,898 A | 10/1988 | Berning et al. | 283/58 |

(Continued)

FOREIGN PATENT DOCUMENTS

DE  43 43 387  6/1995

(Continued)

OTHER PUBLICATIONS

Charlie Bishop, "Possible Future Trends for Aluminium Metallizing", Society of Vacuum Coaters, 47th Annual Technical Conference, Dallas TX, Apr. 24-29, 2004, pp. 6.

(Continued)

*Primary Examiner*—Alessandro Amari
(74) *Attorney, Agent, or Firm*—Matthew A. Pequignot; Pequignot + Myers LLC

(57) ABSTRACT

A multilayer thin film filter is disclosed an organic dielectric layer serving as a spacer layer in a Fabry-Perot structure. The dielectric has embossed regions of varying thicknesses wherein the thickness within a region is substantially uniform. Each different region of a different thickness produces a different color (shift). The size of one of the embossed adjacent regions is such that the color of said one region is uniform and cannot be seen by a human eye as different in color from the uniform color of an adjacent region thereto, and wherein the color within a region can be seen with magnification of at least 10:1. This serves as a covert color coding system useful as a security device.

18 Claims, 17 Drawing Sheets

U.S. PATENT DOCUMENTS

| | | | |
|---|---|---|---|
| 4,838,648 A | 6/1989 | Phillips et al. | 359/585 |
| 4,930,866 A | 6/1990 | Berning et al. | 359/589 |
| 5,002,312 A | 3/1991 | Phillips et al. | 283/72 |
| 5,009,486 A | 4/1991 | Dobrowolski et al. | 359/580 |
| 5,059,245 A | 10/1991 | Phillips et al. | 106/31.65 |
| 5,084,351 A | 1/1992 | Philips et al. | 428/411.1 |
| 5,106,125 A | 4/1992 | Antes | 283/91 |
| 5,128,779 A | 7/1992 | Mallik | 359/2 |
| 5,135,812 A | 8/1992 | Phillips et al. | 428/403 |
| 5,142,383 A | 8/1992 | Mallik | 359/2 |
| 5,171,363 A | 12/1992 | Phillips et al. | 106/31.65 |
| 5,214,530 A | 5/1993 | Coombs et al. | 359/359 |
| 5,254,390 A | 10/1993 | Lu | 428/156 |
| 5,278,590 A | 1/1994 | Phillips et al. | 359/589 |
| 5,279,657 A | 1/1994 | Phillips et al. | 106/31.65 |
| 5,339,737 A | 8/1994 | Lewis et al. | 101/454 |
| 5,364,467 A | 11/1994 | Schmid et al. | 106/404 |
| 5,364,689 A | 11/1994 | Kashiwagi et al. | 428/195.1 |
| 5,411,296 A | 5/1995 | Mallik | 283/86 |
| 5,424,119 A | 6/1995 | Phillips et al. | 428/328 |
| 5,464,710 A | 11/1995 | Yang | 430/1 |
| 5,549,774 A | 8/1996 | Miekka et al. | 156/209 |
| 5,549,953 A | 8/1996 | Li | 428/64.1 |
| 5,571,624 A | 11/1996 | Phillips et al. | 428/403 |
| 5,591,527 A | 1/1997 | Lu | 428/411.1 |
| 5,624,076 A | 4/1997 | Miekka et al. | 241/3 |
| RE35,512 E | 5/1997 | Nowak et al. | 101/454 |
| 5,629,068 A | 5/1997 | Miekka et al. | 428/148 |
| 5,648,165 A | 7/1997 | Phillips et al. | 428/346 |
| 5,650,248 A | 7/1997 | Miekka et al. | 430/1 |
| 5,672,410 A | 9/1997 | Miekka et al. | 428/148 |
| 5,700,550 A | 12/1997 | Uyama et al. | 428/212 |
| 5,742,411 A | 4/1998 | Walters | 359/2 |
| 5,763,086 A | 6/1998 | Schmid et al. | 428/404 |
| 5,855,895 A | 1/1999 | Andrianov et al. | 424/280.1 |
| 5,856,048 A | 1/1999 | Tahara et al. | 430/1 |
| 5,858,078 A | 1/1999 | Andes et al. | 106/437 |
| 5,877,895 A | 3/1999 | Shaw et al. | 359/588 |
| 5,912,767 A | 6/1999 | Lee | 359/567 |
| 5,989,626 A | 11/1999 | Coombs et al. | 427/162 |
| 6,010,751 A | 1/2000 | Shaw et al. | 427/255.7 |
| 6,013,370 A | 1/2000 | Coulter et al. | 428/403 |
| 6,031,457 A | 2/2000 | Bonkowski et al. | 340/572.1 |
| 6,045,230 A | 4/2000 | Dreyer et al. | 359/529 |
| 6,068,691 A | 5/2000 | Miekka et al. | 106/403 |
| 6,112,388 A | 9/2000 | Kimoto et al. | 29/17.3 |
| 6,114,018 A | 9/2000 | Phillips et al. | 428/200 |
| 6,150,022 A | 11/2000 | Coulter et al. | 428/403 |
| 6,157,489 A | 12/2000 | Bradley, Jr. et al. | 359/584 |
| 6,168,100 B1 | 1/2001 | Kato et al. | 241/1 |
| 6,241,858 B1 | 6/2001 | Phillips et al. | 204/192.15 |
| 6,242,510 B1 | 6/2001 | Killey | 523/204 |
| 6,243,204 B1 | 6/2001 | Bradley, Jr. et al. | 359/585 |
| 6,692,830 B2 | 2/2004 | Argoitia et al. | 428/403 |
| 6,712,399 B1 | 3/2004 | Drinkwater et al. | 283/111 |
| 6,749,777 B2 | 6/2004 | Argoitia et al. | 252/582 |
| 6,761,959 B1 | 7/2004 | Bonkowski et al. | 428/156 |
| 6,838,166 B2 | 1/2005 | Phillips et al. | 428/323 |
| 6,987,590 B2 | 1/2006 | Phillips et al. | 359/2 |
| 2003/0058491 A1 | 3/2003 | Holmes et al. | 359/2 |
| 2003/0087070 A1 | 5/2003 | Souparis | 428/204 |
| 2004/0081807 A1 | 4/2004 | Bonkowski et al. | 428/195.1 |
| 2004/0094850 A1 | 5/2004 | Bonkowski et al. | 264/1.34 |
| 2004/0100707 A1 | 5/2004 | Kay et al. | 359/883 |
| 2004/0105963 A1 | 6/2004 | Bonkowski et al. | 428/195.1 |
| 2004/0151827 A1* | 8/2004 | Argoitia et al. | 427/7 |
| 2005/0128543 A1 | 6/2005 | Phillips et al. | 359/15 |
| 2006/0023879 A1 | 2/2006 | Hoshino et al. | 380/54 |

FOREIGN PATENT DOCUMENTS

| | | |
|---|---|---|
| EP | 0 756 945 | 2/1997 |
| EP | 1 353 197 | 10/2003 |
| EP | 1 741 757 | 1/2007 |
| WO | WO 98/12583 | 3/1998 |
| WO | WO 00/08596 | 2/2000 |
| WO | WO 02/00446 | 1/2002 |
| WO | WO 2005/017048 | 2/2005 |
| WO | 2005/038136 | 4/2005 |

OTHER PUBLICATIONS

John M. McKiernan, et al., "Luminescence and Laser Action of Coumarin Dyes Doped in Silicate and Aluminosilicate Glasses Prepared by the Sol-Gel Technique", Journal of Inorganic and Organometallic Polymers, vol. 1, No. 1, 1991, pp. 87-103.

Jeffrey I. Zink, et al., "Optical Probes and Properties of Aluminosilicate Glasses Prepared By The Sol-Gel-Method", Polym. Mater. Sci. Eng., pp. 204-208 (1989).

Don W. Tomkins, Kurz Hastings, Transparent overlays for security printing and plastic ID cards, pp. 1-8, Nov. 1997.

The Mearl Corporation brochure for "Mearl Iridescent Film," Peekskill, New York.

J.A. Dobrowolski; K.M. Baird; P.D. Carman; and, A. Waldorf, "Optical Interference Coatings for Inhibiting of Counterfeiting," Optica Acta, 1973, vol. 20, No. 12, 925-937.

The R.D. Mathis Company Manual for "Thin Film Evaporation Source Reference," Long Beach, California.

Minolta Manual for "Precise Color Communication, Color Control From Feeling to Instrumentation," pp. 18, 20, 22, 23, 46, 47, 48 and 49.

Frans Defilet, LGZ Landis & Gyr Zug Corporation, "Kinegrams 'Optical Variable Devices' (OVD's) For Banknotes, Security Documents and Plastic Cards," San Diego, Apr. 1-3, 1987.

S.P. McGrew, "Hologram Counterfeiting: Problems and Solutions," SPIE, vol. 1210 Optical Security and Anticounterfeiting Systems, 1990, pp. 66-76.

Rudolf L. van Renesse, "Security Design of Valuable Documents and Products," SPIE, vol. 2659, Jun. 1996, pp. 10-20.

Steve McGrew, "Countermeasures Against Hologram Counterfeiting," Internet site www.iea.com/-nli/publications/countermeasures.htm, Jan. 6, 2000.

Roger W. Phillips, "Optically Variable Films, Pigments, and Inks," SPIE vol. 1323, Optical Thin Films III: New Developments, 1990, pp. 98-109.

Roger W. Phillips and Anton F. Bleikolm, "Optical Coatings for Document Security," Applied Optics, vol. 35, No. 28, Oct. 1, 1996, pp. 5529-5534.

J.A. Dobrowolski; F.C. Ho; and, A. Waldorf, "Research on Thin Film Anticounterfeiting Coatings at the National Research Council of Canada," Applied Optics, vol. 28, No. 15, Jul. 15, 1989, pp. 2702-2717.

J. Rolfe, "Optically Variable Devices for Use on Bank Notes," SPIE, vol. 1210 Optical Security and Anticounterfeiting Systems, pp. 14-19, 1990.

OVD Kinegram Cor, "OVD Kinegram Management of Light to Provide Security," Internet site www.kiknegram.com/xhome/home.html, Dec. 17, 1999.

I.M. Boswarva, et al., "Roll Coater System for the Production of Optically Variable Devices (OVD's) for Security Applications," Proceedings, 33rd Annual Technical Conference, Society of Vacuum Coaters. pp. 103-109 (1990).

* cited by examiner

COVERT SECURITY COATING

CROSS-REFERENCE TO RELATED APPLICATIONS

The present invention claims priority from U.S. Patent Application No. 60/691,499 filed Jun. 17, 2005, which is incorporated herein by reference for all purposes.

FIELD OF THE INVENTION

This invention relates generally to thin film optical coatings for use in producing security articles and to the production of diffractive surfaces such as holograms or gratings having color shifting or optically variable backgrounds which can be used as security articles in a variety of applications. More particularly this invention relates to the field of coating and or stamping a dielectric substrate to provide a grating or hologram preferably within a vacuum roll coating chamber while in a vacuum to produce a Chromagram™ type of device or to produce a base device on which to fabricate a Chromagram™ type of device. The invention also relates to the manufacture of a covert optical device having a dielectric layer of varying thickness. By way of example a Chromagram may have a light transmissive substrate having a diffraction grating or hologram etched or embossed into the substrate and wherein patterning of some form is done on the substrate, or the hologram or diffraction grating, generally in the form of an opaque reflective coating. The remaining windows or regions absent the reflective coating can be uncoated or may have another coating covering the windows that is visually distinct from the opaque reflective patterned coating. For example color shifting coatings may be used adjacent to a highly reflective aluminum pattern.

BACKGROUND OF THE INVENTION

The Relevant Technology

Security devices are being used more and more to protect currency and other valuable documents such as passports, drivers' licenses, green cards, identity cards and the like. These security devices are also used to protect commercial products such as pharmaceuticals, cosmetics, cigarettes, liquor, electronic media, wearing apparel, toys and spare parts for automobiles and aircraft from counterfeiting. In fact, it is estimated that counterfeit articles now comprise between 5% and 7% of world trade. Holograms attached to such articles have been the traditional method to foil counterfeiters.

Color shifting pigments and colorants have been used in numerous applications, ranging from automobile paints to anti-counterfeiting inks for security documents and currency. Such pigments and colorants exhibit the property of changing color upon variation of the angle of incident light, or as the viewing angle of the observer is shifted. The primary method used to achieve such color shifting colorants is to disperse small flakes, which are typically composed of multiple layers of thin films having particular optical characteristics, throughout a medium such as paint or ink that may then be subsequently applied to the surface of an object.

Diffraction patterns and embossments, and the related field of holographs, have begun to find wide-ranging practical applications due to their aesthetic and utilitarian visual effects. One very desirable decorative effect is the iridescent visual effect created by a diffraction grating. This striking visual effect occurs when ambient light is diffracted into its color components by reflection from the diffraction grating.

In general, diffraction gratings are essentially repetitive structures made of lines or grooves in a material to form a peak and trough structure. Desired optical effects within the visible spectrum occur when diffraction gratings have regularly spaced grooves in the range of hundreds to thousands of lines per millimeter on a reflective surface.

Diffraction grating technology has been employed in the formation of two-dimensional holographic patterns which create the illusion of a three-dimensional image to an observer. Three-dimensional holograms have also been developed based on differences in refractive indices in a polymer using crossed laser beams, including one reference beam and one object beam. Such holograms are called volume holograms or 3D holograms. Furthermore, the use of holographic images on various objects to discourage counterfeiting has found widespread application.

There currently exist several applications for surfaces embossed with holographic patterns which range from decorative packaging such as gift wrap, to security documents such as bank notes and credit cards. Two-dimensional holograms typically utilize diffraction patterns, which have been formed on a plastic surface. In some cases, a holographic image which has been embossed on such a surface can be visible without further processing; however, it is generally necessary, in order to achieve maximum optical effects, to place a reflective layer, typically a thin metal layer such as aluminum, or a high index layer, like ZnS, onto the embossed surface. The reflective layer substantially increases the visibility of the diffraction pattern embossment.

Every type of first order diffraction structure, including conventional holograms and grating images, has a major shortcoming even if encapsulated in a rigid plastic. When diffuse light sources, such as ordinary room lights or an overcast sky, are used to illuminate the holographic image, all diffraction orders expand and overlap so that the diffraction colors are lost and not much of the visual information contained in the hologram is revealed. What is typically seen is only a silver colored reflection from the embossed surface and all such devices look silvery or pastel, at best, under such viewing conditions. Thus, holographic images generally require direct specular illumination in order to be visualized. This means that for best viewing results, the illuminating light must be incident at the same angle as the viewing angle. In addition upon rotation by 90 degrees even in specular light, the standard hologram disappears and all one sees is a silver like patch since now the groves of the diffraction pattern are mainly oriented in line with the incoming light as ones eye; i.e. no diffraction occurs.

Since the use of security holograms has found widespread application, there exists a substantial incentive for counterfeiters to reproduce holograms, which are frequently used in credit cards, banknotes, and the like. Thus, a hurdle that security holograms must overcome to be truly secure, is the ease at which such holograms can be counterfeited. One step and two step optical copying, direct mechanical copying and even re-origination have been extensively discussed over the Internet. Various ways to counteract these methods have been explored but none of the countermeasures, taken alone, has been found to be an effective deterrent.

One of the methods used to reproduce holograms is to scan a laser beam across the embossed surface and optically record the reflected beam on a layer of a material such as a photopolymerizable polymer. The original pattern can subsequently be reproduced as a counterfeit. Another method is to remove the protective covering material from the embossed metal surface by ion etching, and then when the embossed metal surface is exposed, a layer of metal such as silver (or any other easily releasable layer) can be deposited. This is followed by deposition of a layer of nickel, which is subsequently released to form a counterfeiting embossing shim.

Due to the level of sophistication of counterfeiting methods, it has become necessary to develop more advanced security measures. One approach, disclosed in U.S. Pat. Nos. 5,624,076 and 5,672,410 to Miekka et al., embossed metal particles or optical stack flakes are used to produce a holographic image pattern.

A further problem with security holograms is that it is difficult for most people to identify and recollect the respective images produced by such holograms for verification purposes. The ability of the average person to authenticate a security hologram conclusively is compromised by the complexity of its features and by confusion with decorative diffractive packaging. Thus, most people tend to confirm the presence of such a security device rather than verifying the actual image. This provides the opportunity for the use of poor counterfeits or the substitution of commercial holograms for the genuine security hologram.

In other efforts to thwart counterfeiters, the hologram industry has resorted to more complex images such as producing multiple images as the security device is tilted to the right or left. These enhanced images provide the observer with a high level of "flash" or aesthetic appeal. Unfortunately, this added complexity does not confer added security because this complex imagery is hard to communicate and recollection of such imagery is difficult, if not impossible, to remember.

U.S. Pat. No. 6,761,959 to Phillips et al, assigned to JDS Uniphase Corp. discloses a security article having Chromagram™ thereon. The chromagram provides both color shifting and holographic effects to the viewer. In the '959 patent an organic substrate stamped with a holographic grating or pattern is coated with a color shifting multilayer film.

United States patent application 2005/0128543 in the name of Phillips et al, assigned to JDS Uniphase Corp. discloses a more complex type of Chromagram™ wherein patterning is shown. In some regions, holographic effects are shown, and in other regions only color shifting effects are visible.

Another United States patent application which discloses diffraction gratings with color shifting coatings but deviates from the teaching of Phillips et al, is U.S. patent application 2003/0058491, in the name of Holmes et al. United States Patent application '491 appears to deviate from the teaching of Phillips in that a decoupling layer is taught as way in which to separate the diffraction grating effects from the color shifting effects. Holmes suggests placing a decoupling layer between the relief structure and the thin film reflection filter, which is described to be a thin film reflection filter.

In contrast to Holmes et al. prior art U.S. Pat. No. 6,987,590 teaches a different novel Chromagram™ wherein a decoupling layer is not required, but wherein separate color shifting and holographic effects are exhibited. For example in FIG. 6 a color shifting ink provides color shifting effects and a reflective coating adjacent thereto provides holographic effects.

In all of these aforementioned security structures, coating is suggested in common, known ways. That is, by first stamping a grating, and subsequently applying the coating layers required to create the desired patterns of reflective and color shifting coatings. Although these prior art fabrication methods appear to perform their intended function, of making Chromagram-like structures having both holographic and color shifting effects, it would be most advantageous, if the entire process or most of the fabrication process was performed in-situ, within the vacuum roll coating machine.

It would therefore be of substantial advantage to develop a suitable, practicable, process and apparatus that would allow a diffraction grating or hologram to be formed within a vacuum coating chamber on an organic dielectric layer (ODL) wherein coating of the hologram or grating with a reflective and or color shifting coating was performed to the ODL before or after forming the diffraction grating or hologram within the vacuum chamber without breaking the vacuum.

More particularly, it is an object of this invention to provide an in-line process for providing a hologram or grating in a roll type process within a vacuum chamber without breaking vacuum.

Another aspect of this invention which can be fabricated in an in-line system as mentioned above, or is not restricted to manufacture in an in-line system is related to providing an organic dielectric layer within a Fabry-Perot structure or a dielectric stack formed structure, wherein the organic dielectric layer has a varying thickness, and wherein the effects of the dielectric structure of varying thickness can only be seen under magnification.

The provision of a dielectric layer with a varying thickness has been disclosed in U.S. Pat. No. 5,877,895 issued in the name of Shaw et al. Mar. 2, 1999. Shaw et al disclose applying heat variably to create a dielectric layer of varying thickness. Due to the size of the apparatus necessary to provide a thickness difference, adjacent regions of varying thickness are quite large and the effects are noticeable, as is apparently desired.

There is no mention or suggestion with the Shaw et al. patent to providing covert security features.

In contrast, in an aspect of this invention, a security device is provided wherein a dielectric layer therein has a plurality of adjacent regions. At least one adjacent region of the dielectric layer has a thickness that is less than an adjacent region of the same layer. The dimensions of at least one of the regions is small enough such that a visual effect from the difference in the two adjacent regions is not visible to the human eye, however a visual color difference is visible with magnification of 10:1 or greater. Preferably the different color regions differ in their color from one another by at least a delta E value of 10.

It is a further object of the invention to provide a dot matrix grating having a dielectric spacer layer having different thicknesses throughout, so as to provide different visual colors in accordance with the different thicknesses.

Thus, it is an object of the invention to provide a security device having a dielectric layer forming a Fabry Perot cavity or within a dielectric stack of dielectric layers wherein the dielectric layer has varying thicknesses so as to form optical cavities exhibiting different colors as visible light is incident thereon; and wherein the visual effect of the different colors is not seen without magnification. In addition, these different regions each have their own color shift with viewing angle.

STATEMENT OF THE INVENTION

In accordance with an aspect of this invention, there is provided, a multilayer thin film filter having an organic dielectric layer therein, spanning a plurality of regions of the filter, wherein the dielectric layer is embossed to define the plurality of regions of different uniform thicknesses, wherein some adjacent regions of the dielectric layer have a different uniform thickness, and wherein the size of one of the embossed adjacent regions is such that the color of said one region is uniform and cannot be seen by a human eye as different in color from the uniform color of an adjacent region thereto, and wherein the color within a region can be seen with magnification of at least 10:1

In accordance with the invention, there is further provided, a multilayer thin film filter having an organic dielectric layer therein sandwiched between an absorber and reflector layer, wherein the dielectric layer is embossed to provide a covert security information only discernible with magnification.

In accordance with the invention, there is further provided, a multilayer thin film filter comprising an organic dielectric layer therein, spanning a plurality of regions of the filter, wherein the dielectric layer is embossed in at least one region to define a different thickness than in an adjacent region and wherein the embossing is of a dimension that produces an optical effect that cannot be seen by a human eye without magnification of at least 10 times; an absorber layer covering the organic dielectric layer; and, a reflector layer supporting the organic dielectric layer.

In accordance with another aspect of the invention there is provided, a multilayer thin film filter having a dielectric layer having a first region embossed with a diffraction grating and having adjacent regions that are absent a diffraction grating to provide contrast, wherein both regions provide different color shift effects when the filter is tilted with respect to the viewing angle and wherein the embossed region provides diffractive and thin film interference effects.

In accordance with another aspect of the invention, there is provided, a method of coating comprising the steps of:

disposing within a vacuum chamber roll of light transmissive substrate embossed with a diffraction grating or hologram; and, patterning a reflector with an oil printing technique so as to evaporate a reflective material within the vacuum chamber without breaking vacuum.

In accordance with the invention there is provided a method of providing a chromagram comprising the steps of:
 embossing an organic coating;
 curing the organic coating;
 demetallized patterning of a reflective layer upon the embossed organic coating;
 curing through the substrate to fully cure the organic coating, thereby allowing a relatively soft organic dielectric into which the embossing can occur.

In accordance with the invention there is further provided a method of coating is provided comprising the steps of:
 disposing a releasable substrate roll of dielectric material into a vacuum chamber;
 embossing the dielectric material while within the vacuum chamber; and,
 coating the dielectric material while within the vacuum chamber; wherein coating the dielectric material may be done before embossing.

In accordance with the invention a method is provided for coating a substrate comprising the steps of:
 disposing the substrate within a vacuum roll coater;
 embossing the substrate;
 evaporating an absorber upon the substrate
 depositing an organic layer upon the absorber layer;
 patterning a reflector with upon the organic layer within the vacuum roll coater;
 performing steps (b) through (e) without breaking vacuum.

In accordance with another aspect of the invention a filter is provided having an organic dielectric layer (ODL) which forms an active part of the filter, wherein the ODL has varying thicknesses and is sandwiched between an absorber layer and a reflector layer, or wherein the ODL forms one of a pair of dielectric layers, wherein the varying thicknesses provide different reflected colors only visible with magnification of at least 10 times.

In a preferred embodiment the color difference between two covert colors formed by a dielectric layer of different thickness as described in this document has a $\Delta E$ value of at least 10.

BRIEF DESCRIPTION OF THE DRAWINGS

Exemplary embodiments of the invention will now be described in conjunction with the drawings in which.

DETAILED DESCRIPTION

Figure 1:
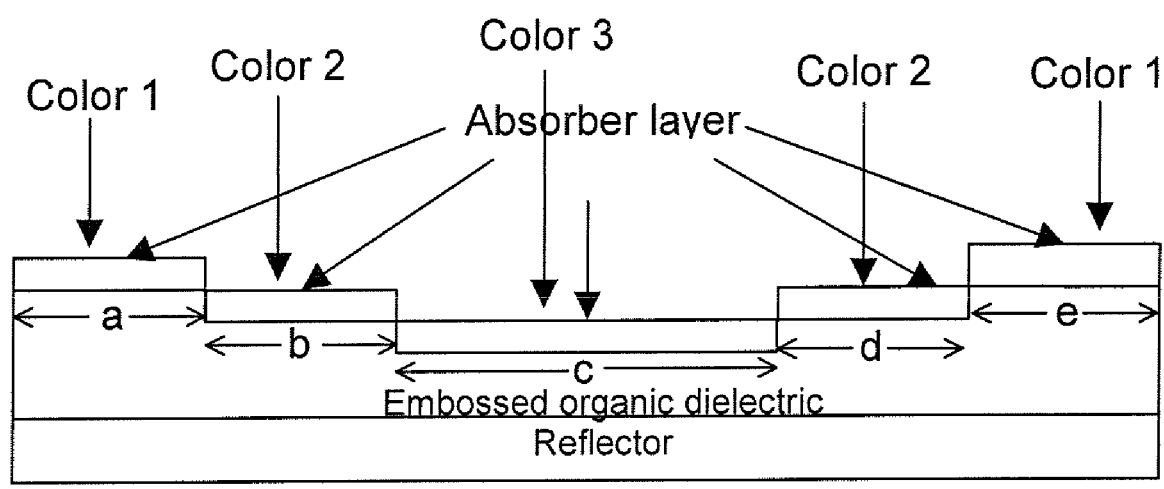
FIG. 1 is a cross sectional view of multilayer Fabry-Perot foil in accordance with an embodiment of the invention, wherein a variable thickness stepped layer of organic dielectric material is shown sandwiched between a uniform thickness reflector layer and a uniform thickness absorber layer, wherein a square wave pattern is embossed in the dielectric.

Turning now to FIG. 1, a portion of a sheet of foil 100 is shown in cross section, wherein the foil 100 includes a bottom reflector layer 102 having a uniform thickness; upon the reflector layer 102 is deposited on an organic dielectric layer 104 which is embossed so as to have a varying thickness and providing dielectric spacer regions differing in thickness. An absorber layer 106 is deposited to a uniform thickness over the variable thickness organic dielectric layer 104. In a preferred embodiment, the size of the adjacent regions (a) through (e) should be less than the size of a pixel or element that can be seen by the human eye. However, the invention does not require all adjacent steps or different thickness regions to be less than the size a human eye can see, however there must at least be one such element or region to provide the covert desired feature. For example, any element (a) through (e) could be sized to be small enough so that magnification is required to see it, whereas adjacent elements can be large enough to be seen by a human eye; however, preferably, several adjacent pixels or pixels within a sheet or flake are of dimensions that cannot be individually seen by a human eye. Furthermore, preferably the several adjacent pixels under magnification show distinctly different colors, thereby providing a covert color code or pattern, hidden within the structure. With reference to FIG. 1, if the totality of regions, a, b, c, d, and e comprise an area less than 100 microns square, which is the approximately the smallest region an unaided eye can see, distinguishing different colors from a, b, and c will not be possible.

Since the dielectric layer in regions, a, b and c are purposefully embossed with different thicknesses, using judicious selection of the embossing depths, light reflecting back to the viewer after impinging upon the reflector will be three different distinct colors. However due to the small size of the regions a, b, and c, the eye will tend to integrate and if the pixel or region defined by (a) through (d) inclusive can be seen; only a single color will be perceived. With sufficient magnification, the individual regions (a), (b), and (c) will be seen and different colors will be perceived.

It is preferred the color difference be significant enough to be clearly identifiable, and not just distinguishable between two very close colors.

In the La*b* color space system, the colors are plotted in a plane of the CIELAB-system in which a* represents red and green and b* represents yellow and blue. The lightness of the color is on an axis at right angles to the plane going from black or L*=0 to white where L*=100. Thus the color would be grey in the center of the plane with the chroma increasing from the center toward the outer perimeter of the plane. The extreme edge of the plane defines the highest chroma. For example, a red light emitting laser would have high chroma. Between the center and edge, there are various gradations of the red as for example, a pink. Thus, there are planes of these colors which move up and down the L* axis or the lightness value axis. For every illuminant-observer combination of the tristimulus value, the color coordinates can be readily calculated and also can be measured. It is well known to those skilled in the art of color, that any pigment, colored foil or any color can have a different appearance depending upon the illuminant. For example a color under fluorescent light may be quite different from the color under sunlight or under a tungsten lamp.

Thus a pigment may be irradiated with a predetermined amount of energy across the wavelength to provide a graph of power versus wavelength. The quantity of light or energy impinging or striking the pigment at a given wavelength will influence the reflectance curve. The spectral power distribution from the light source is integrated with the eye response function typically designated as x, y and z and the reflectance spectrum to yield the tristimulus values X, Y and Z.

In connection with the present invention, the L*, a*, b* (CIELAB) color space in used to describe the invention since this system is the most uniform (linear in color) known to date and is generally accepted worldwide for practical use. Thus, in the CIELAB color space, the color of any optically variable device can be characterized by the three tristimulus values, X, Y and Z. These tristimulus values take into account the spectral distribution of the light source, the reflectance of the optically variable pigment and the spectral sensitivity to the human eye. It is from these X, Y and Z values that the L*, a*, b* coordinates are calculated as are the related values of L* (lightness), C* (chroma), h (hue) and associated color differences i.e. delta L*, delta C* and delta h. Thus any color can be represented by the L, a* b*.

color $(L_1^*, a_1^*, b_1^*)$ and color $(L_2^*, a_2^*, b_2^*)$ is defined as: The difference between any two colors, $$\Delta E^*_{ab} = [(\Delta L^*)^2 + (\Delta a^*)^2 + (\Delta b^*)^2]^{1/2}$$

In effect, a covert color code not recognizable by an unaided human eye is present within the coating, wherein only a single integrated color is perceived by an unaided eye looking at the structure. The thickness of the dielectric in these covert different color regions differs and is uniform throughout a region. Preferably, these regions form a square or rectangular wave pattern, however this pattern need not be periodic.

Similarly a color shifting dielectric stack of high and low index dielectric layers can serve as a covert coating by using one or more dielectric layers wherein the thickness varies similarly, such that at least one region having a thickness distinct from other regions, is not visible by the unaided human eye, but is distinguishable with suitable magnification.

One way in which to manufacture the structure of FIG. 1 is to (a) provide an incoming roll of polyester; (b) coat one side with an absorber such as Cr; (c) evaporate the organic dielectric layer over the Cr layer; (d) emboss the organic dielectric layer; and, (e) coat the embossed organic dielectric layer with a reflective layer with a material such Al.

Figure 2:
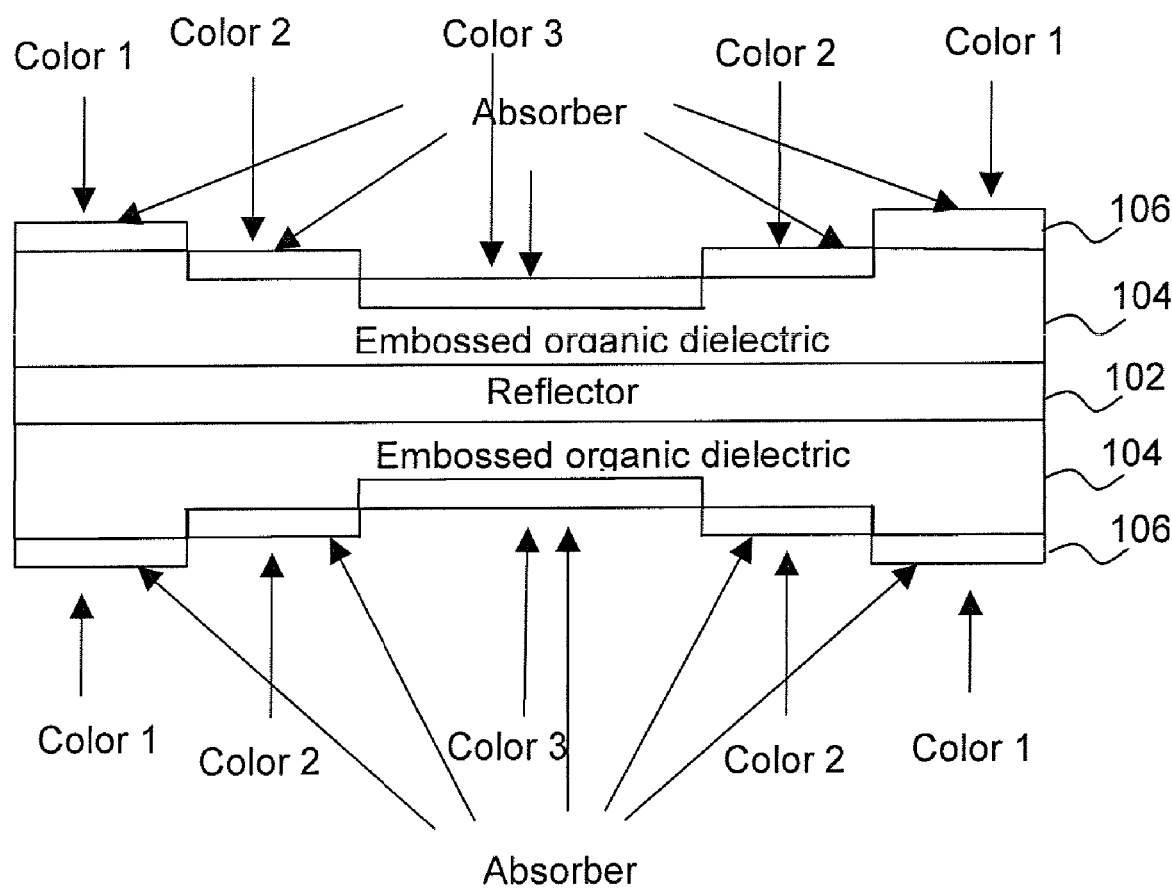
FIG. 2 is a cross sectional view of a symmetric multilayer Fabry-Perot foil shows two similar structures shown back to back sharing a common central reflector layer, in accordance with an embodiment of the invention.

Referring now to FIG. 2 a symmetric structure is shown having small regions of different thicknesses. The structure depicted in FIG. 2 is similar in many respects to that described above in FIG. 1, however, the reflector layer is a common layer to two same embossed dielectric, absorber coated layers. Conveniently, the structure shown in FIG. 2 lends itself to being broken or ground into pigment flakes or particles. Notwithstanding, the structure shown in FIG. 1 can also be used as non-symmetric pigment coating.

Although the cross section shown in FIGS. 1 and 2 would lead one to conclude the regions are square or rectangular, this invention is not limited to embossing only squares, rectangles, and the like. Circles, triangles or other regions can be embossed, as long as some of the regions are small enough not to be detected without significant magnification. The structure shown in FIG. 2 is made by passing an aluminum foil that had been coated on both sides with the organic spacer 104 through opposing embossing rollers. The organic layer may be deposited by passing the aluminum foil through a bath by moving the foil through a bath containing an organic coating/solvent and pulling the aluminum foil out straight out using a process known as dip-coating, followed by drying off the solvent. Alternatively the organic coating 104 could be applied on one side, cured, and after flipping over the roll, the other side is coated. After embossing the organic coating the absorber layer is deposited onto the embossed organic layers. Alternatively, a PET substrate coated symmetrically on both sides with a reflector layer and an organic spacer is passed between the opposing embossing rollers and then the absorber layer would be deposited onto each of the embossed layers. The absorber is subsequently added to each side and then embossed. The absorber may be an electro-less deposit of metal such as nickel, silver or tin or could be any semi-transmissive layer deposited from vacuum. The two-sided embossed structures provide a material suitable for chopping into glitter which would be a unique color shift material. Depending the desired result both organic layers need not be embossed. Although it is preferably that the embossed regions are flat, and substantially parallel to the reflector layer, this need not be and the layer may be angled at an angle other than zero with respect to the reflector layer. In a preferred embodiment the covert color pattern within a covert sheet or flake has an embossed dielectric with at least three distinct thicknesses and at least three distinct covert colors.

Figure 3A:
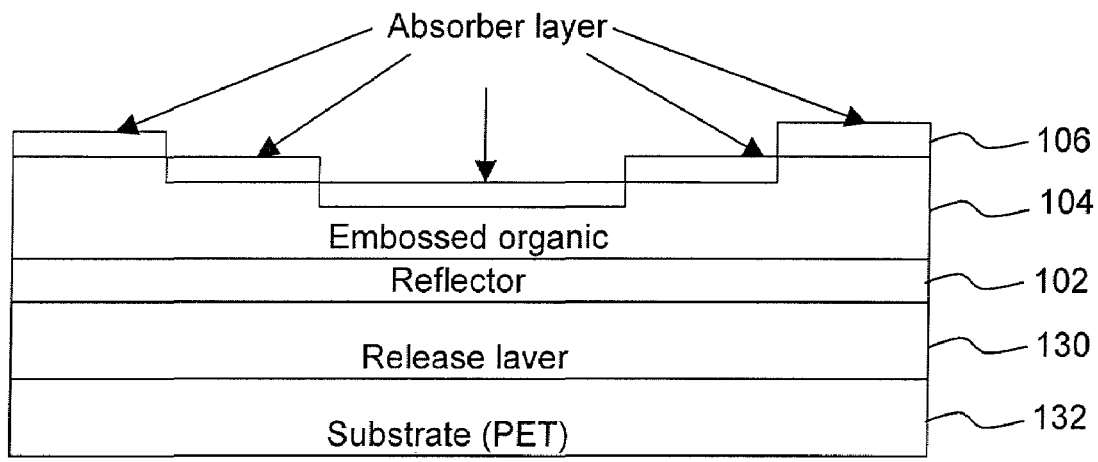
FIG. 3a, is a cross sectional view similar to FIG. 1, wherein a release layer is provided between the structure shown in FIG. 1 and a substrate, providing an embossed foil on a releasable substrate.

Turning now to FIG. 3a a structure similar to FIG. 1 is shown wherein the embossed organic structure is shown upon a substrate 132 having a release layer 130. Once the foil is stripped from the substrate it can be used to make flakes, which have covert features therein.

A hot-stamped structure can be made very similarly to the structure of FIG. 1, but in reverse order, wherein the steps employed are: providing a polymer release layer on a substrate; depositing a chrome layer; evaporating an organic dielectric layer; embossing the organic dielectric; depositing a reflective layer, followed by an adhesive layer.

Figure 3B:
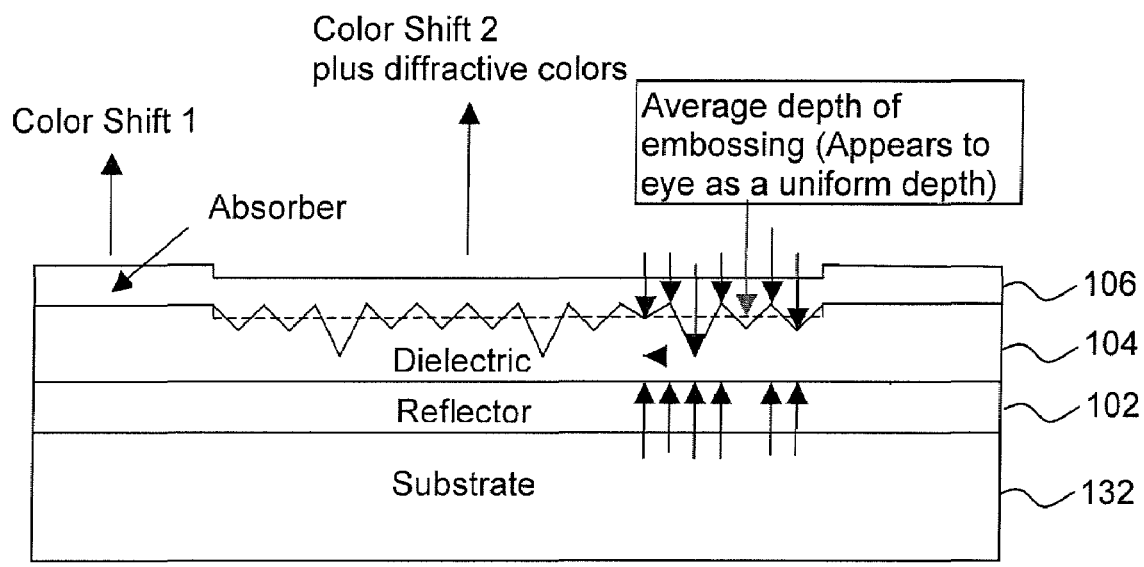
FIG. 3b is a cross sectional view of a non-symmetric Fabry-Perot chromagram having a dielectric spacer shown with two different thickness and wherein the spacer is embossed with a grating.

Referring to FIG. 3b, a different embodiment of a Fabry-Perot diffractive structure is shown, having a dielectric layer 104 embossed to one thickness as shown with the dotted line. If one embosses into the dielectric layer of a Fabry Perot filter the average depth of the embossing to a first approximation is the midpoint between the average ridge height and the average valley depth. The region shown in dotted outline is not flat and has ridges and valleys therewithin. Since the distance between ridges and valleys are below the resolution one one's eye, all one sees from the Fabry Perot filter after the Cr absorber layer 106 is added to the dielectric layer is a color shift underneath the relief structure that is a different color shift from those areas not embossed. The colors arising from the different thicknesses of the ridges and valleys blend together so as to appear to the eye as being silver. Thus, the combination of the color from the embossed area is the sum of the effects of the ridges and valleys of the dielectric, that is, the silver-like color plus the color shift from the apparent uniform thickness of the underlying dielectric plus the diffractive effect.

Figure 4:
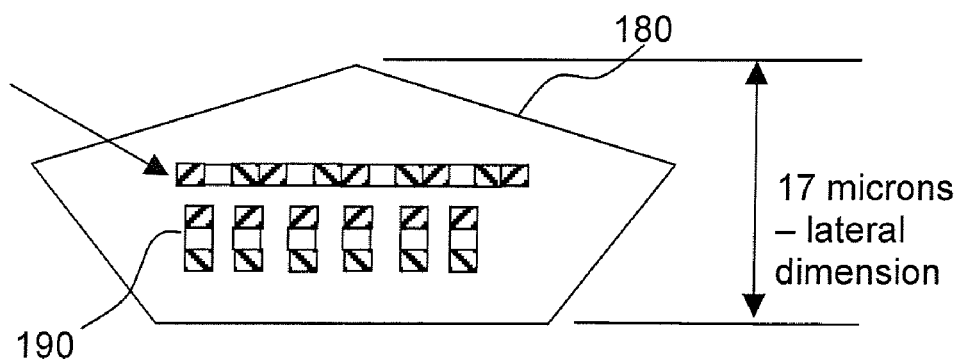
FIG. 4 is a plan view of a single Fabry-Perot flake having a single row and multi-column array of covert colored regions, wherein adjacent colored regions display a different color.

FIG. 4 is an illustration of a Fabry-Perot flake 180 having lateral dimensions of about 17 microns and wherein an array or pattern 190 of 2 micron embossing of squares having a different uniform depth are shown varying from blue to green in color effect. However due to the size of the 2 micron squares, magnification of at least 50 times is required to see the color coded squares and to discern their colors, and preferably, a 400 times magnification is required to comfortably distinguish the color of the 2 micron squares. If the pixel element was 80 microns square a magnification of about 1.25 would be required to just see it, and to see it would ease, a magnification of approximately 12.5 would be required.

Figure 5:
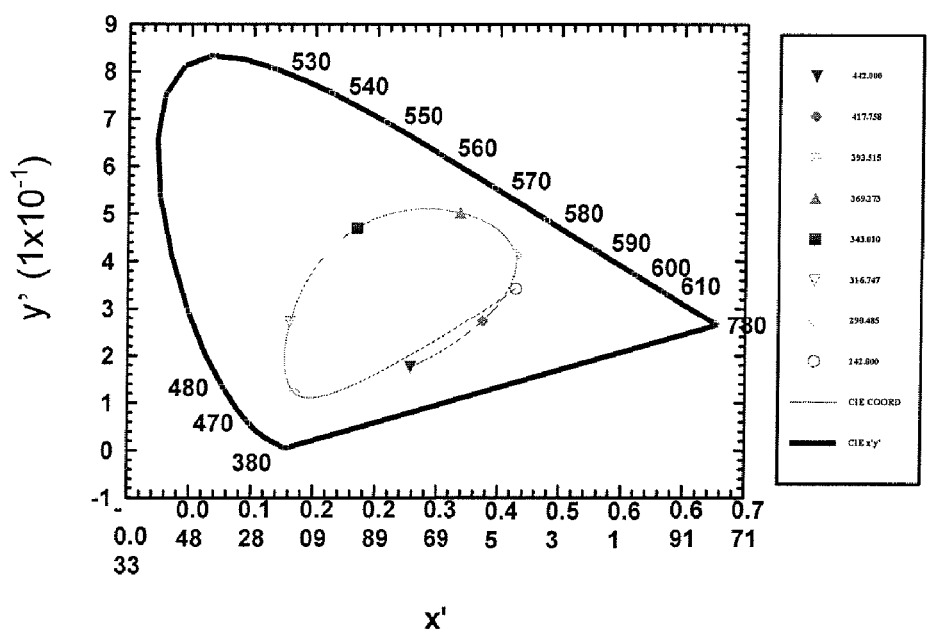
FIG. 5 is a color chart showing the gamut of colors due to embossing in a Fabry Perot cavity for an organic layer embossed to different thicknesses.

FIG. 5 is an illustration showing the gamut of colors due to embossing in a Fabry-Perot cavity for an organic layer embossed to 0.232-0.442 microns.

Figure 6:
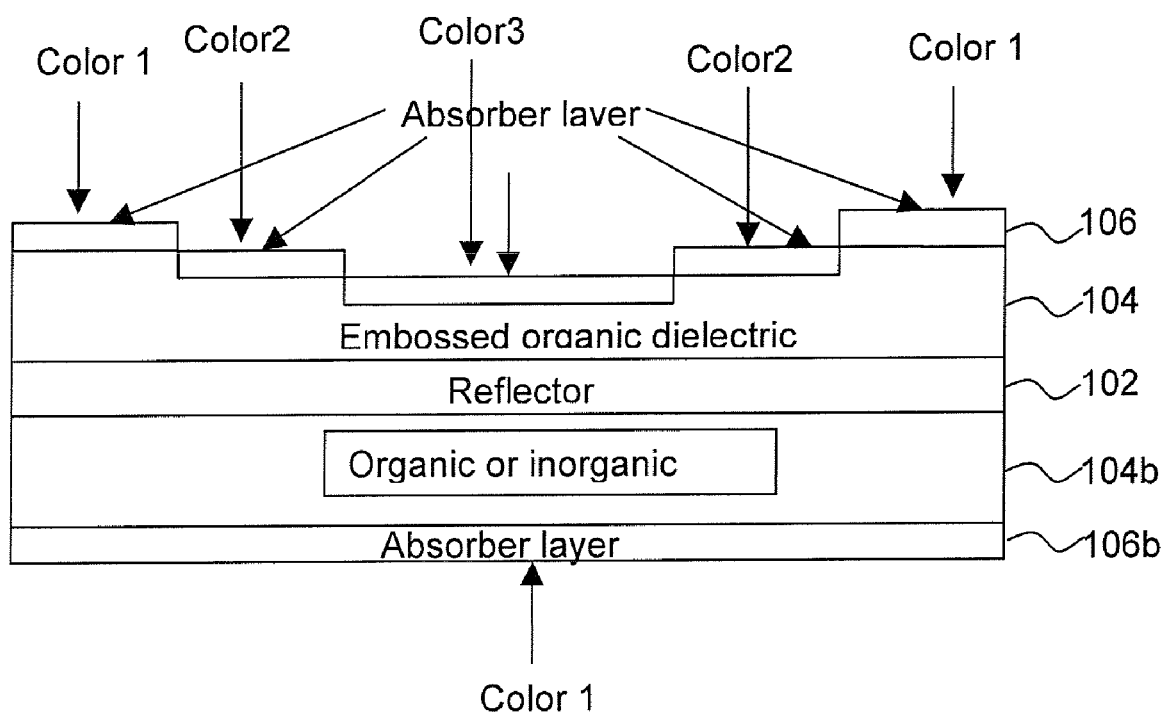
FIG. 6 is a cross sectional view of a non-symmetric Fabry Perot structure having color effects viewed from either side.

An alternate structure is illustrated in FIG. 6 that has similar but different effects from the symmetrical structure shown in FIG. 3. Although the reflector layer 102 is shared between two Fabry Perot cavities, the upper cavity has the covert coating therein, wherein the lower cavity displays a single color with no covert features therein. The lower cavity dielectric layer 104b and 106b could also be made having a thickness that would provide a color effect which was similar in appearance to the color that is integrated by the brain after viewing the variable thickness Fabry-Perot structure. Thus, if flakes were made, and were small enough, the perceived color would be essentially uniform with little, if any, perceived variation. Although embodiments shown heretofore illustrate several different thicknesses within a flake or regions, it would be possible to make a flake having a dielectric layer with only a single small region with a different thickness than the rest of the flake to provide the covert feature. It should also be noted that the covert region having the different thickness dielectric can be in the form of a logo or other indicia that can easily be recognized when sufficiently magnified.

Figure 7:
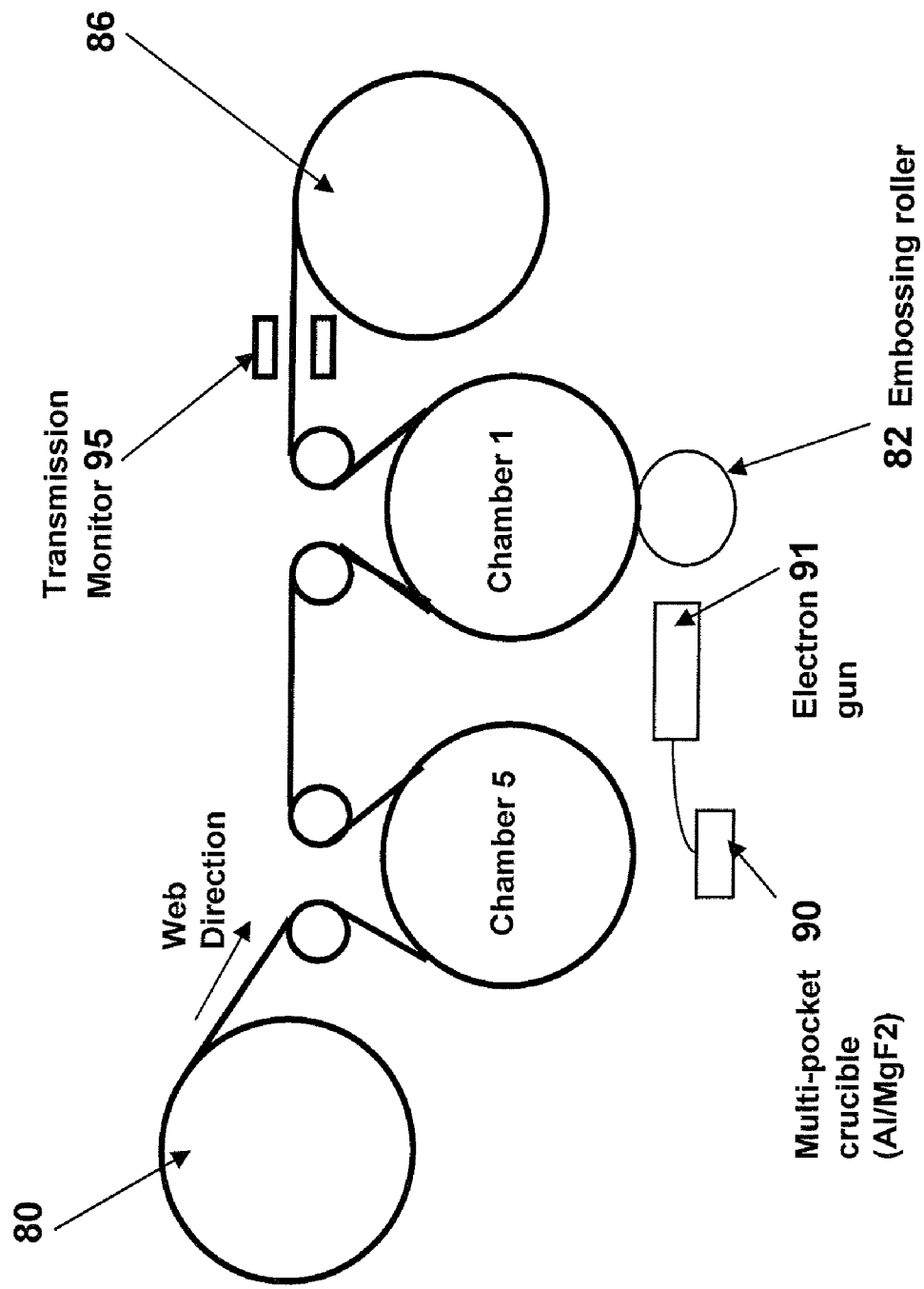
FIG. 7 is a diagram of an in-line vacuum roll coater for making holograms in accordance with an embodiment of this invention.

Turning now to FIG. 7 an in-line system is shown for making a holographic relief structure. The process flow starts by introducing a web of plastic into the vacuum chamber at the unwind station 80. The plastic web may have a coating of a release hard-coat layer for hot stamping the final product, or alternatively, the plastic web may be an uncoated plastic film such as a polyester terephthlate (PET) film for making labels or security threads. On top of the plastic web or release hard-coat layer is a resin layer capable of being embossed. A single layer employing a release hard coat that is embossible may also be used. The web then moves to the first station, Chamber 5, and is coated uniformly with aluminum, after which the coated web is embossed in Chamber 1. This produces a reflective, relief type structure, by way of example, holograms capable of being hot stamped onto articles for security protection or feed for pressure sensitive labels.

Figure 8:
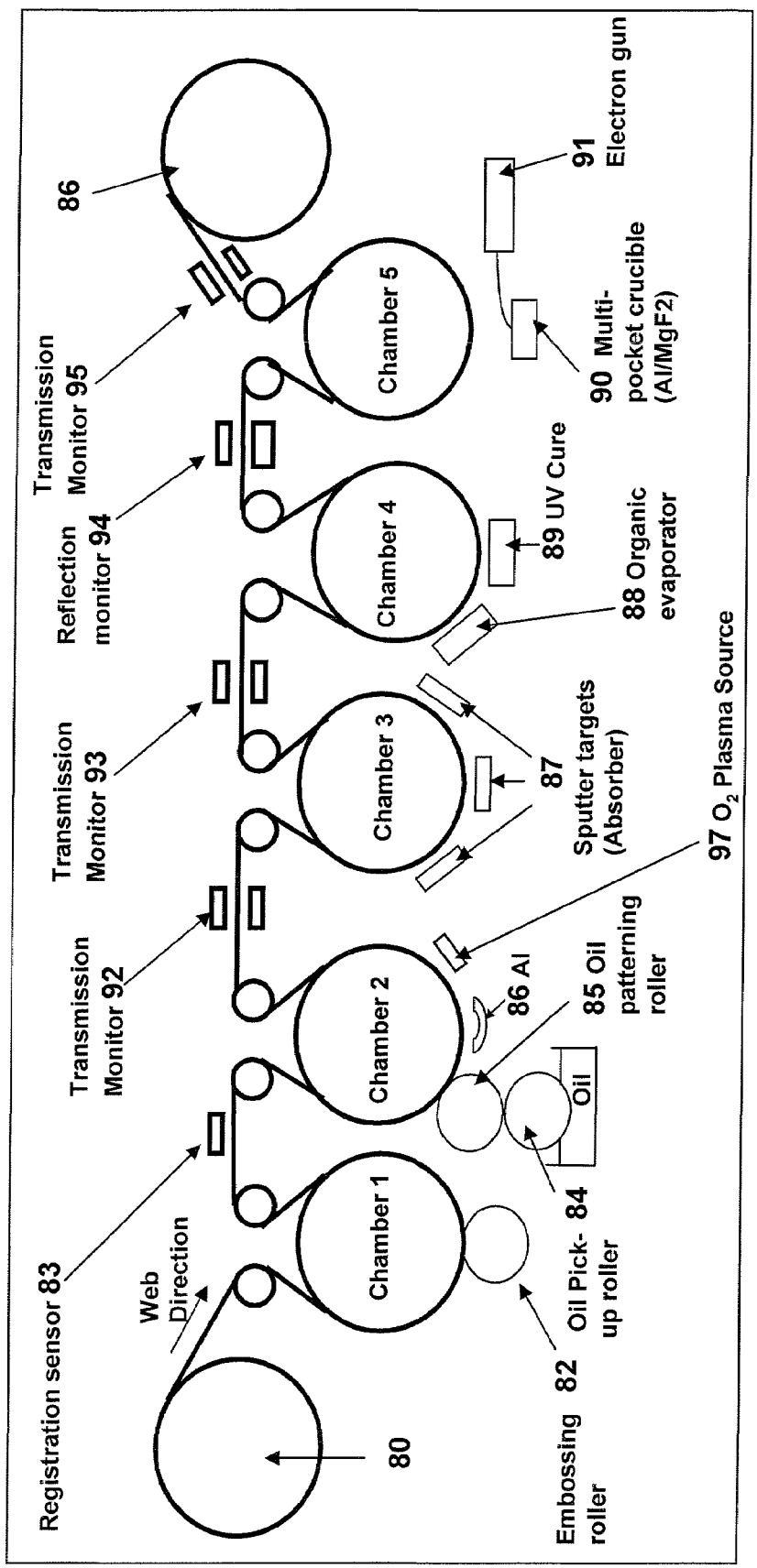
FIG. 8 is a diagram of an in-line vacuum roll coater for making demetallized Chromagrams™.

FIG. 8 shows a complete process for making a demetalized Chromagram™ in one or two passes. Each chamber is situated in its own pumping chamber (not shown) and each chamber is used as a module for each separate operation. By using this type of modular approach, each module can be physically moved and interchanged for another module within the vacuum machine so that the order of operations can easily changed for variations in the way the security products are made.

The processing chamber includes an unwind reel 80, Chamber 1 which has an embossing roller 82; a registration sensor 83 is provided between Chamber 1 and 2. Chamber 2 includes of an oil patterning unit that includes an oil pick-up roller 84, an oil-patterning roller 85 and a resistance source of Al 86 and an optional UV or electron beam cure station. A plasma treatment unit 97 comprising an $O_2$ plasma source is included after the aluminum deposition but before the first front surface roll to ensure that any residual oil is burned off and does not contaminate the metallized surface or give ghosting. Chamber 3 has of an array of DC magnetron sputtering units 87 for depositing the absorber layer. Chamber 4 includes a processing unit to deposit organic acrylics followed by a UV cure station 89. Chamber 5 has a multi-pocket crucible 90 for e-beam coating by electron beam gun 91 of either an inorganic dielectric or a reflective metal. Transmittance monitors 92, 93 and 95, a reflection monitor 94 are also provided within the modular vacuum roll coater system.

A variation of this process described above allows for the production of non-demetallized (non-demet) Chromagrams™. In this process flow, the resin layer on the incoming web is embossed in Chamber 1, then coated with an absorber layer at Chamber 3 and is subsequently coated in Chamber 5 with an inorganic dielectric such as MgF2. The roll is then reversed and coated in Chamber 2 with a reflector with the patterning unit turned off so as to complete the Fabry Perot structure. Finally, the non de-met Chromagram™ is wound onto the unwind roller 80. This process flow is shown in the second flow process in FIG. 8.

De-met Chromagrams can also be produced using color shifting ink or adhesive.

Another variation of the processes described above, wherein the same modular system can be used is where the PET release hard coat encounters Chamber 1 and 2 to produce demetallized holograms. After passing Chamber 2 the roll of PET including de-met holograms is wound directly onto the wind-up roll 86. This can then be subsequently processed off-line with color shifting ink or color shifting adhesive to make hot stamp Chromagrams.

Figure 9:
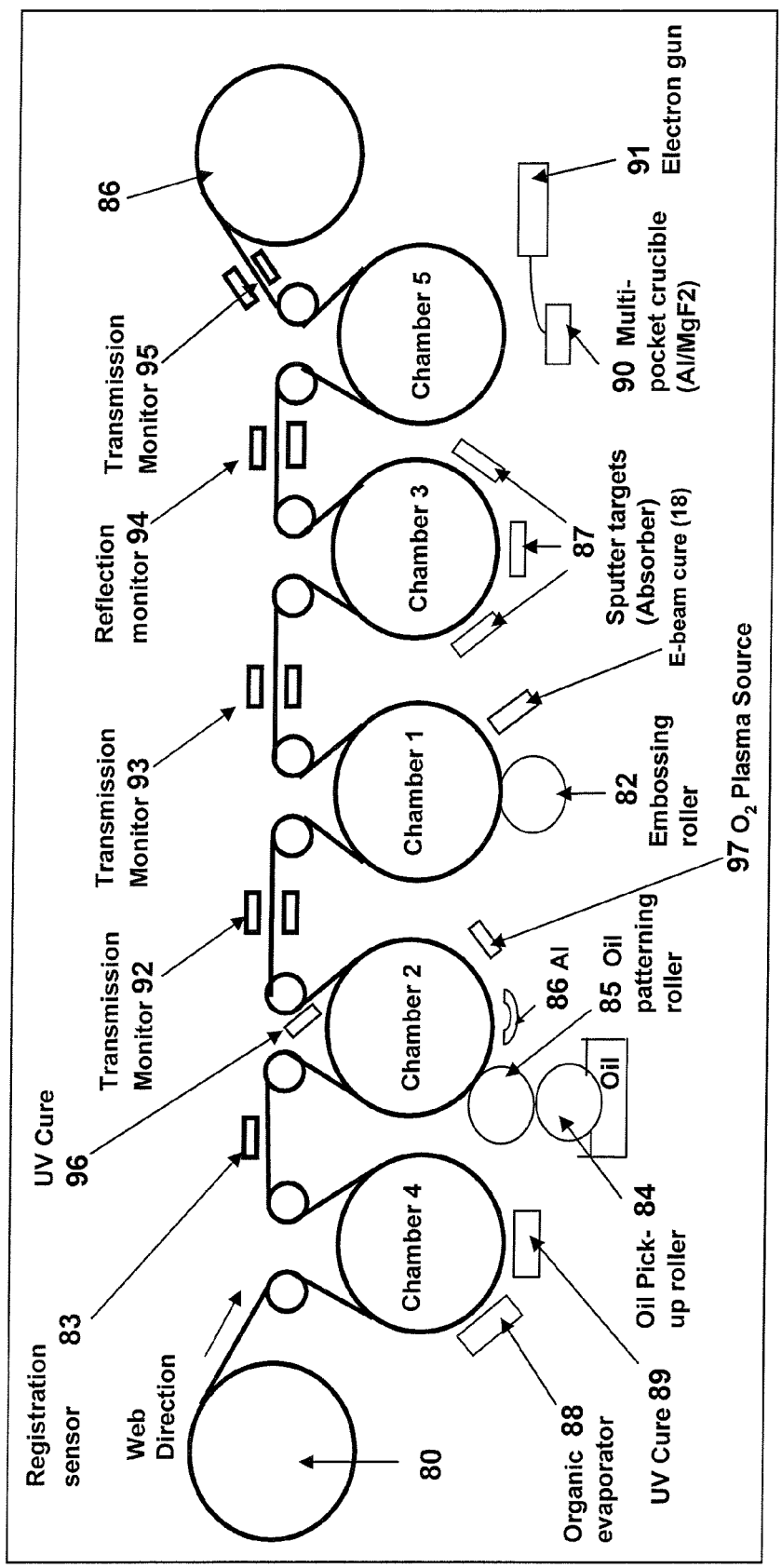
FIG. 9 is a diagram of an in-line vacuum roll coater for making demetallized Chromagrams™.

Referring now to FIG. 9 an in-line vacuum roll coater system is shown for making Demet Chromagrams™. In this embodiment, an embossing resin is applied as a first step. A PET web is introduced to the vacuum coater and coated with the acrylic coating in Chamber 4. In this instance, the lacquer is a coating of a UV curable acrylic monomer based on a technology available from Sigma Technologies Inc of Phoenix, Ariz. A UV lamp or e-beam is provided at Chamber 4 to provide partial or full cure of the acrylic layer takes place at curing station 9 depending on the monomer used. If a partial cure is used, then a full cure by another UV source or electron beam 96 is used following the aluminum deposition by UV curing using a UV lamp 9 transparent substrate or e-beam through the non-UV transparent web following Chamber 4.

Since polymers are degraded by UV light, an alternative embodiment is provided, in order to lessen the likelihood of degradation and decay of the polymer substrate due to UV absorption in accordance with Beer's Law. Therefore in this embodiment completion of the polymer is achieved by the use of an electron beam gun but positioned of the metal side of the substrate before the first front surface roller after the aluminum deposition rather than via a UV lamp. In this instance the electrons penetrate the aluminum coating. It could be expected that the aluminum thickness would be in the range 10-100 nm and penetration is sufficient using electron beam curing in air where the electrons have to penetrate a titanium foil of the order 7 microns thickness. Preferably, the electron beam source be driven at a higher voltage in order to penetrate to the full polymer depth than if there were no metal there at all but this would still be much less than an atmospheric electron beam cure system. Although not shown in the figure, plasma treatment following the polymer coating may be provided to increase the surface energy to improve the metal adhesion.

Figure 18:
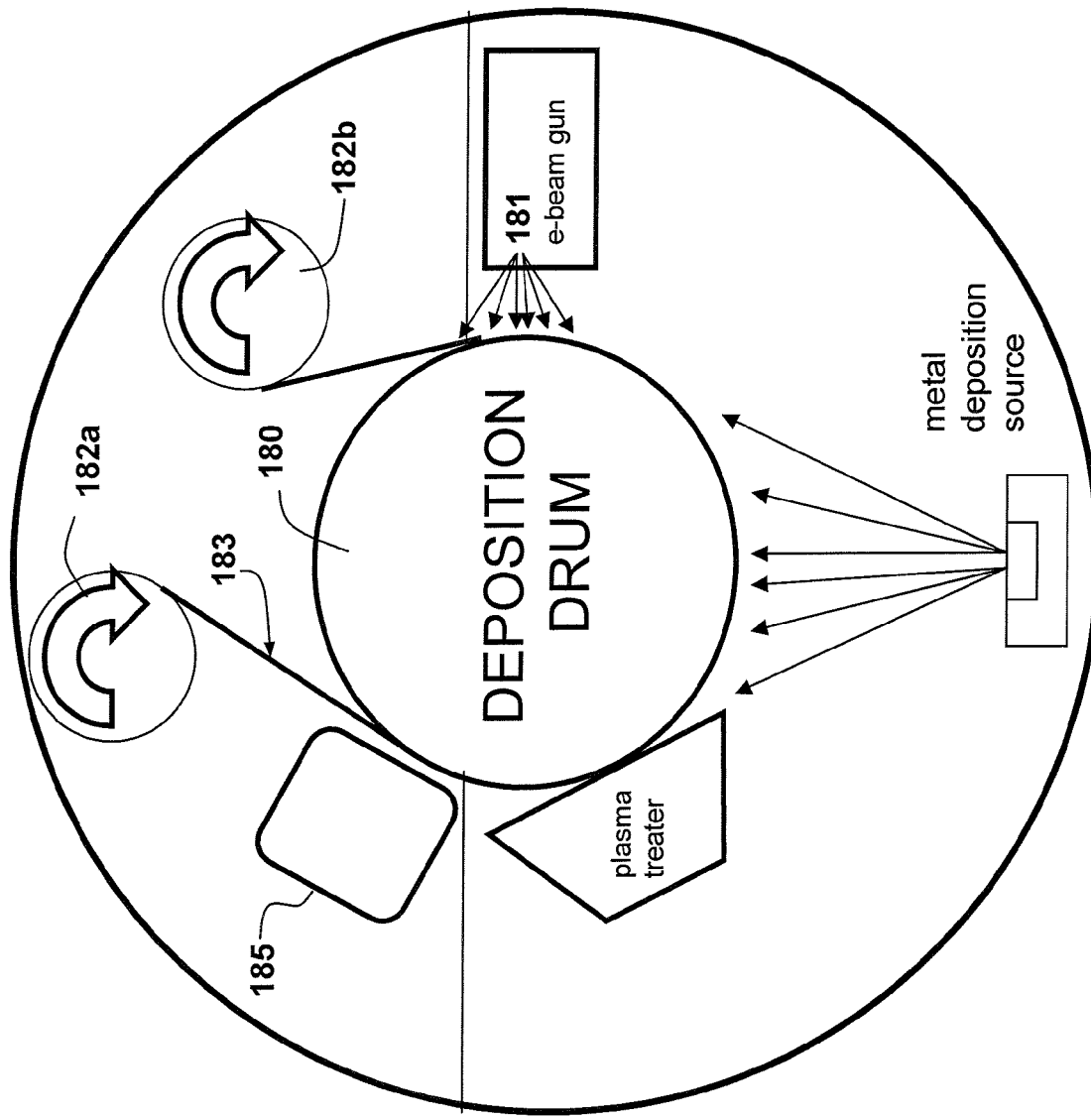
FIG. 18 is a cross section diagram illustrating a deposition drum having various components in communication therewith.
Figure 19:
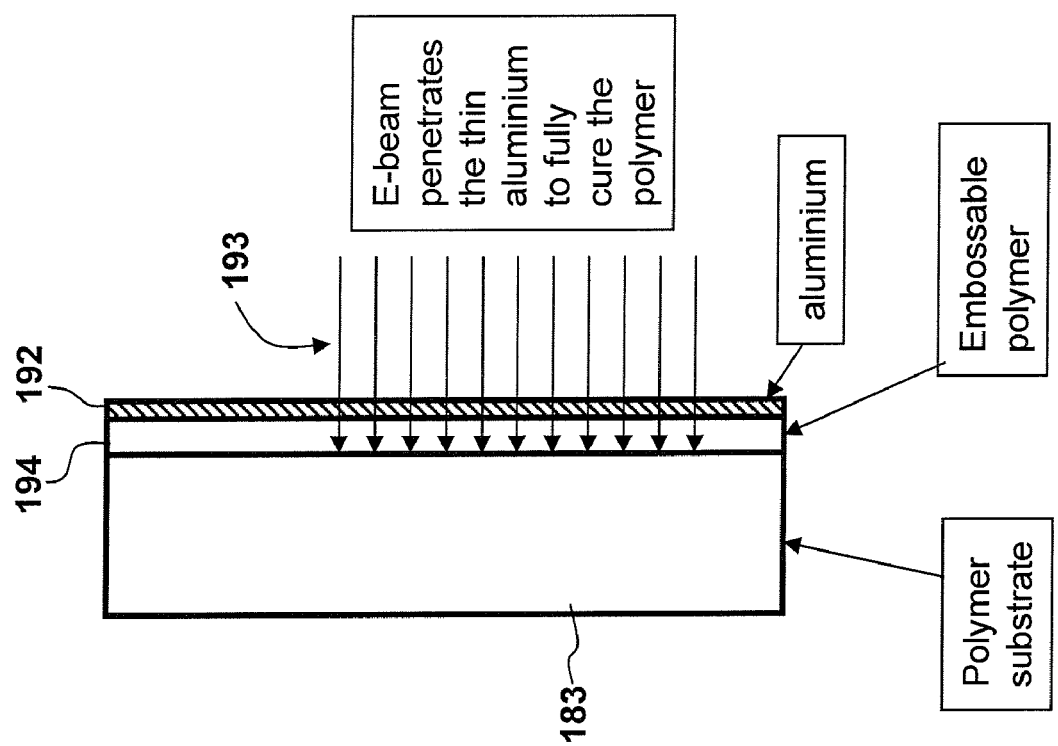
FIG. 19 is a cross sectional side view of electron beams penetrating a thin aluminium layer through and into the embossible polymer layer.

Referring now to FIG. 18 a system is shown wherein a reel 182a provides an uncoated web 183 of substrate material to a deposition drum 180 and further to a subsequent reel 182b. After leaving the reel 182a the web 183 passes through the deposition unit 185 and the plasma treater 184 for a partial cure of the deposited polymer. A reflective metal such as Al is deposited on the organic dielectric coated web 183 via a metal deposition source 186. An e-beam gun 181 penetrates the thin Al coating 192 to fully cure the embossible polymer 194. FIG. 19 is a cross-sectional view of the e-beams 193 penetrating the thin Al layer 192 to fully cure the embossible polymer 194 layer beneath supported by the polymer substrate 183.

Furthermore, plasma treatments may be provided after metallization before further polymer coatings are applied. Some of the polymers do not adhere easily and so it is always preferable to prepare the surface using plasma treatment to make sure the surface energy is maximized to help the depositing coating wet out the surface. The plasma treatment before applying the polymer was an argon/nitrogen plasma treatment so that there was no oxygen present to inhibit the polymer cure whereas the plasma treatment of the acrylate before the metal deposition was using an argon/oxygen plasma to provide some oxygen to aid chemical bonding directly between the polymer and metal via the oxide After the web passes from Chamber 4 it then encounters Chamber 2 where a patterned or non-patterned aluminum layer is deposited. A plasma treatment $O_2$ source 97 is provided to clean up any residual oil and to prevent or lessen ghosting. The web then moves to Chamber 1.

Preferably, Chamber 1 uses a drum that is compliant so that the embossing is effective. The steel drum can be wrapped with a hard rubber sleeve that does not outgass. The embossing roller can be heated and the rubber on the drum cooled. Embossing can be selectively applied or over the entire surface of the web or can be applied as indicated just on the aluminum islands. The oil patterning process technology is commercially available. At this point, the roll can travel directly to the wind-up roller without the use of other process steps for the production of demetallized holograms or other types of de-met relief structures or non demetallized structures. These structures can then be subsequently coated with color shift ink in the non-aluminized areas to make ink based or OVP adhesive based Chromagrams™. This coating arrangement allows for embossing into the aluminum which eliminates the possibility of the organic layer fouling of the embossing roller.

For further processing, the web travels to Chamber 3 and 5 where it is coated with the absorber layer (Cr), a dielectric layer ($MgF_2$) and a full reflective layer (Al) is deposited in the reverse direction. In this instance, final wind-up occurs on the un-wind roller 81. Alternatively, the web can be coated with absorber layer, reversed in the machine and sequentially coated with the organic acrylic layer followed by the reflective aluminum layer to make a Chromagram with an organic dielectric rather than an inorganic dielectric. In this case, also the final wind up occurs at the un-wind station.

Process flows include:

1) Plastic film (e.g. PET type G)→emboss→aluminize across whole width of web→hologram or diffractive label.

2) Plastic film plus release/resin)→emboss→aluminize across whole width of web→hot stamp relief reflective hologram or production of diffractive flake with/without symbols.

3) Plastic film→UV acrylic→cure→aluminize→emboss →hologram or diffractive label.

4) Plastic film→UV acrylic→partial cure→aluminize in pattern→emboss→full cure→Evaporation of absorber layer →deposition of dielectric layer→deposition of reflector layer→De-met Label Chromagram. (Note: embossing may be in register with the aluminum or across aluminum and non-aluminum areas.

5) Plastic film with release/resin→aluminize in pattern →emboss→Deposition of absorber layer→Deposition of dielectric layer→deposition of reflector layer→Hot stamp demet Chromagram.

6) Plastic film with release/resin→Deposition of absorber →UV acrylic→Deposition of reflector→Deposition of reflector→Hot Stamp Non-Demet Chromagram.

7) Plastic film→Deposition of absorber→UV acrylic →Deposition of reflector→Deposition of reflector→Label Non-Demet Chromagram.

Embossing

Embossing can be done in a variety of different ways. The shim can be pressed into the polymer with enough pressure to force the polymer to flow into the shim profile. This becomes easier if heat is used to soften the polymer. Alternatively lower melting point polymers can be used or even in the extreme case a liquid monomer can be used where the cure is done, whilst the liquid has taken up the shim profile and solidified the polymer.

When using pressure, or heat and pressure, there is a tendency for the polymer to relax slightly following easing the pressure and the polymer partly recovers the flat surface. Thus the diffraction grating or hologram can appear less bright that the shim original. Full depth embossing usually requires some heat and pressure used together; immediately following the hot nip there is a chilled roll to remove the heat as fast as possible to limit the amount of relaxation of the polymer.

The UV cure process that cures the polymer whilst still in contact with shim provides the best chance of obtaining a full depth embossing however some release difficulties can occur.

Embossing can be difficult even at atmospheric pressure, and the degree of difficulty can depend on the quality of the embossing shims and on the profile of the embossing pattern. For example sinusoidal and pyramidal patterns are easier profiles to work with compared with square wave zero order diffraction type or deep aspect ratio patterns.

The problem is for the shim to release the malleable polymer. At times the polymer may separate from the substrate and clog up the shim, which then fails to emboss on the next and subsequent revolution. To minimize the propensity for the polymer sticking an operator, in a system at atmospheric pressures, would spray the shim with a release agent.

Notwithstanding this problem is exacerbated in a vacuum system where it becomes difficult to identify when the shim needs another application of the release spray, and so a method of controlling the shim surface is an aspect of this invention. In accordance with an embodiment of this invention, and as is shown in FIG. 10, the shim 101 can be treated with a contained plasma of a gas mixture of argon and a second component such as fluorinated gas such that the surface energy of the shim can be reduced and so that the shim would be coated and surface treated to provide a low energy surface analogous to a non-stick surface such as PTFE.

Figure 10:
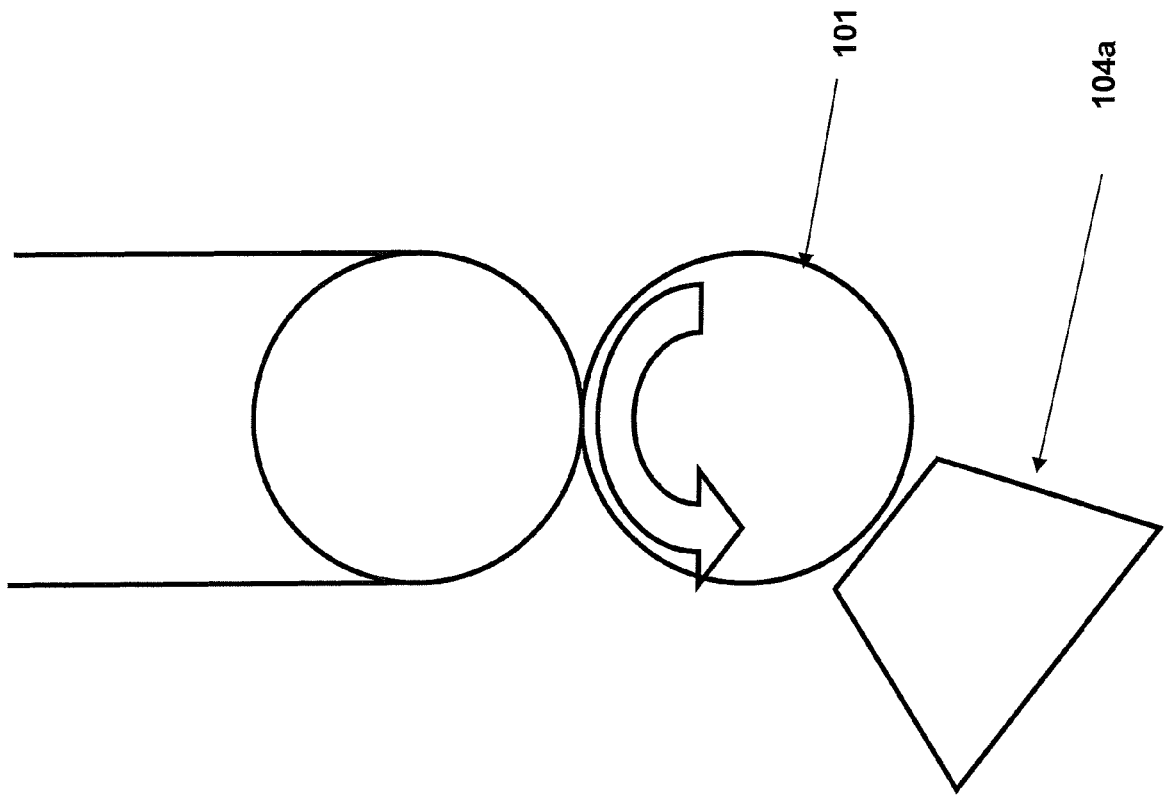
FIG. 10 is a diagram of an embossing station wherein a plasma treatment unit is provided to reduce the surface energy of the shim to lessen sticking.

In FIG. 10 a plasma treater 104a is shown adjacent the embossing roll 101 to fluorinate the shim as a method of providing a release coating to the shim Using a fluorinated plasma with a low level of fluorination would deposit a monolayer, or less, of a PTFE type non-stick coating to the surface. Any monolayer or so that is lost by being taken away by the polymer as it is released it would be replaced during the next revolution of the shim past the plasma.

Alternatively an inert gas plasma as a source of UV can be used to sure cure the polymer in-situ whilst still in the shim. This would not work so well if the polymer coating were already metallized.

These could be combined in single plasma but the polymer surface would then also become fluorinated and so non-stick. This would make the polymer harder to add coatings to and so would really only be useful if the polymer coating were to be the final layer.

Figure 11:
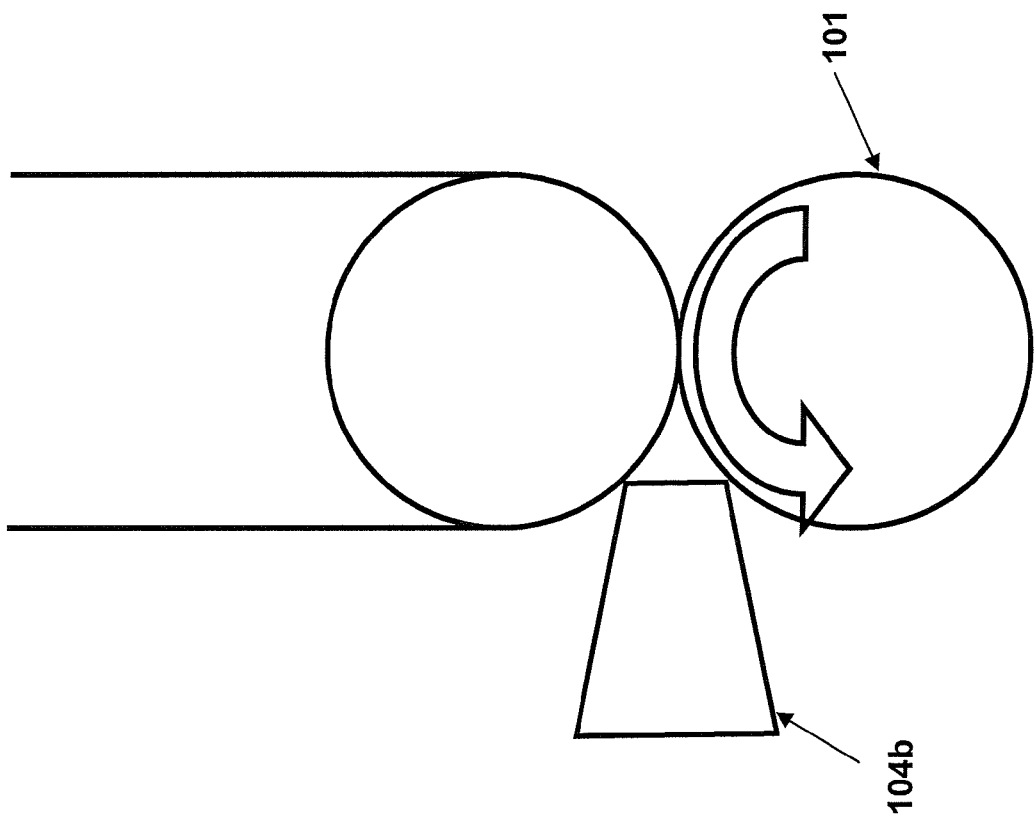
FIG. 11 is a diagram of an embossing station wherein a plasma treatment unit is provided to provide UV cure of the polymer as it leaves the shim.

Referring now to FIG. 11, Inert gas plasma is shown to provide UV cure of polymer as it leaves the shim to help maximise the embossing depth. Also if the UV penetrates to cure the polymer whilst it is still in the shim it can aid the polymer release from the shim in two ways. One is the polymer strength is increased by the fuller cure and second as the cure takes place there is usually a shrinkage in the polymer thickness which would help pull the polymer out of the shim.

Figure 12:
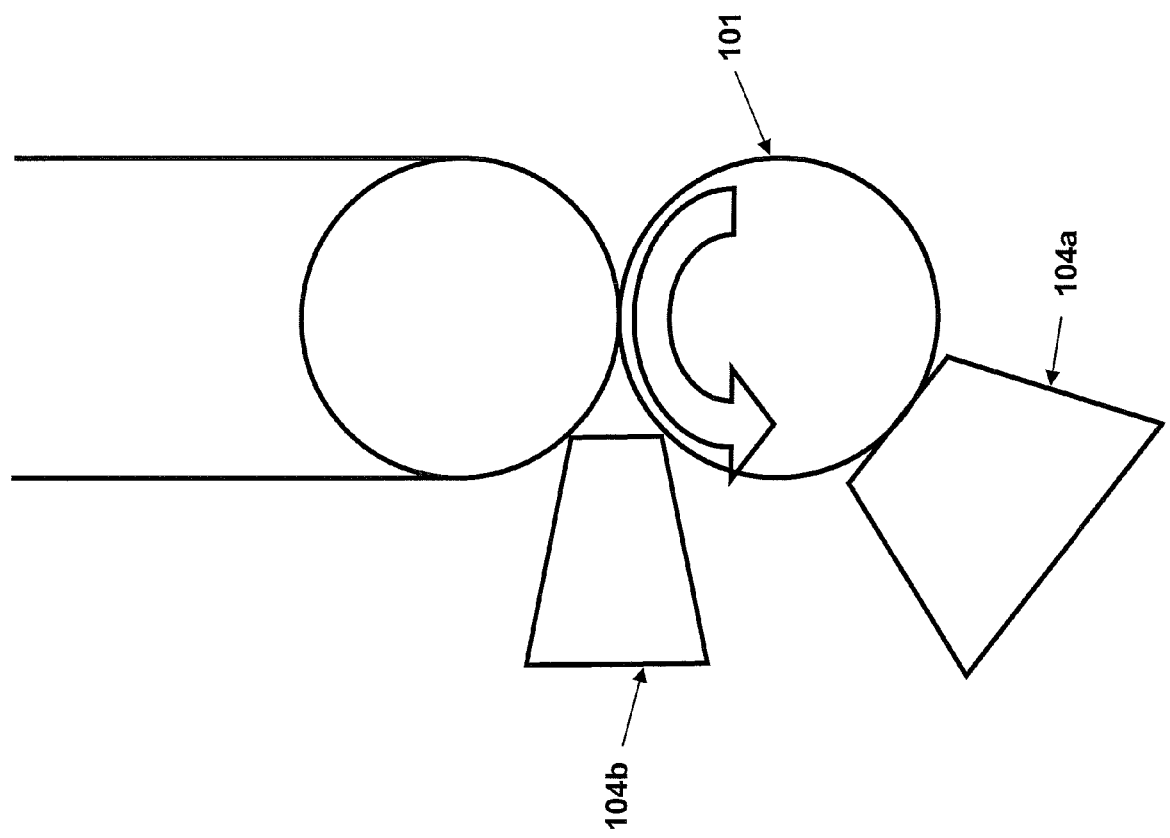
FIG. 12 is a diagram of an embossing station combining the embodiments shown in FIGS. 9 and 10.

FIG. 12 illustrates a preferred embodiment where the use of two plasmas 104a, 104b on the same shim 101 is provided. Alternatively and less preferably would be to incorporate the two processes into one plasma. By so doing, unfortunately the embossed polymer would also have the low energy surface and this would make sticking the next layer onto this surface more difficult.

Figure 13:
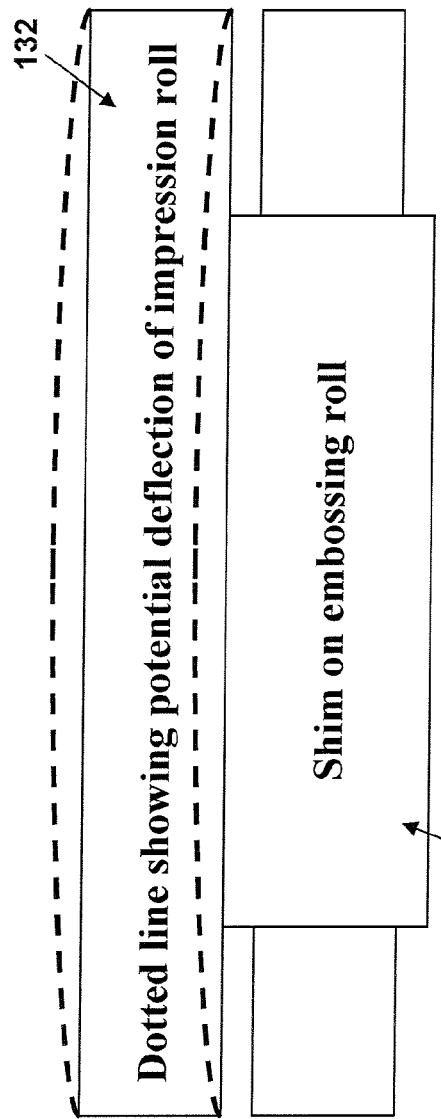
FIG. 13 is a diagram of an embossing shim on an embossing roll illustrating unwanted deflection of the impression roll.

Turning now to FIG. 13, an embossing setup is shown wherein a shim 130 on a non-compliant embossing roll is shown. When embossing without a compliant roll it is common, with increasing pressure, to cause a deflection of the impression roll 132 as is shown in dotted outline, thus causing variations in the embossing depth from the centre of the web to the edges.

Figure 14:
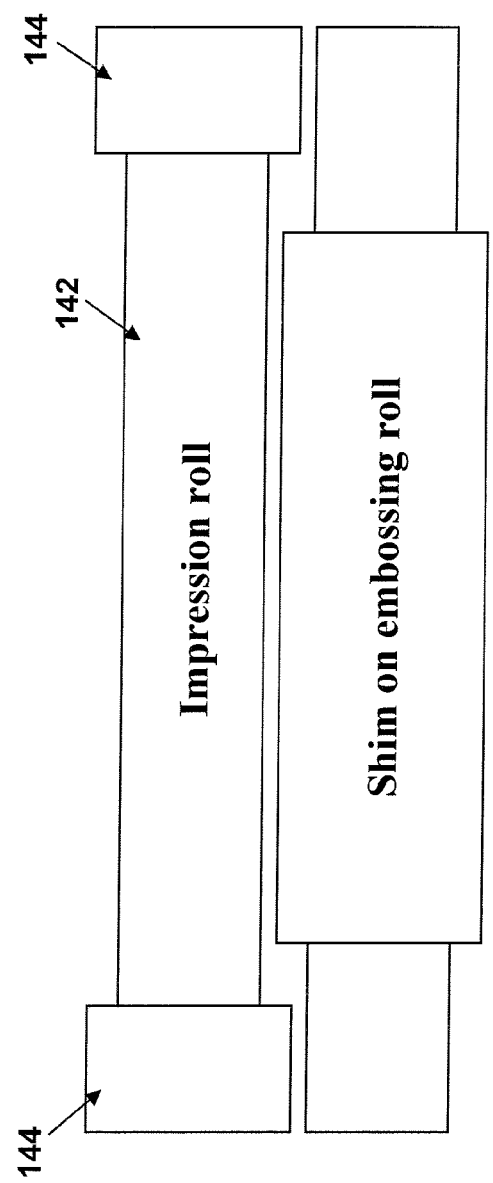
FIG. 14 is a diagram of a preferred embodiment wherein little or no depression of the impression roll.

An option shown in FIG. 14 is to use a hard impression roll 142 having stepped ends 144 that are beyond the edges of the shim, and are larger in diameter. This defines the limit of how close the rolls can be run together thus preventing the impression roll deflecting as the load is taken up by the larger diameter ends of the roll. The diameter of these ends needs to take account of the substrate thickness plus the polymer layer that is to be embossed. Advantageously, this allows either a harder compound compliant roll or a hard metal impression roll to be used.

Polymer Deposition Process

Figure 15:
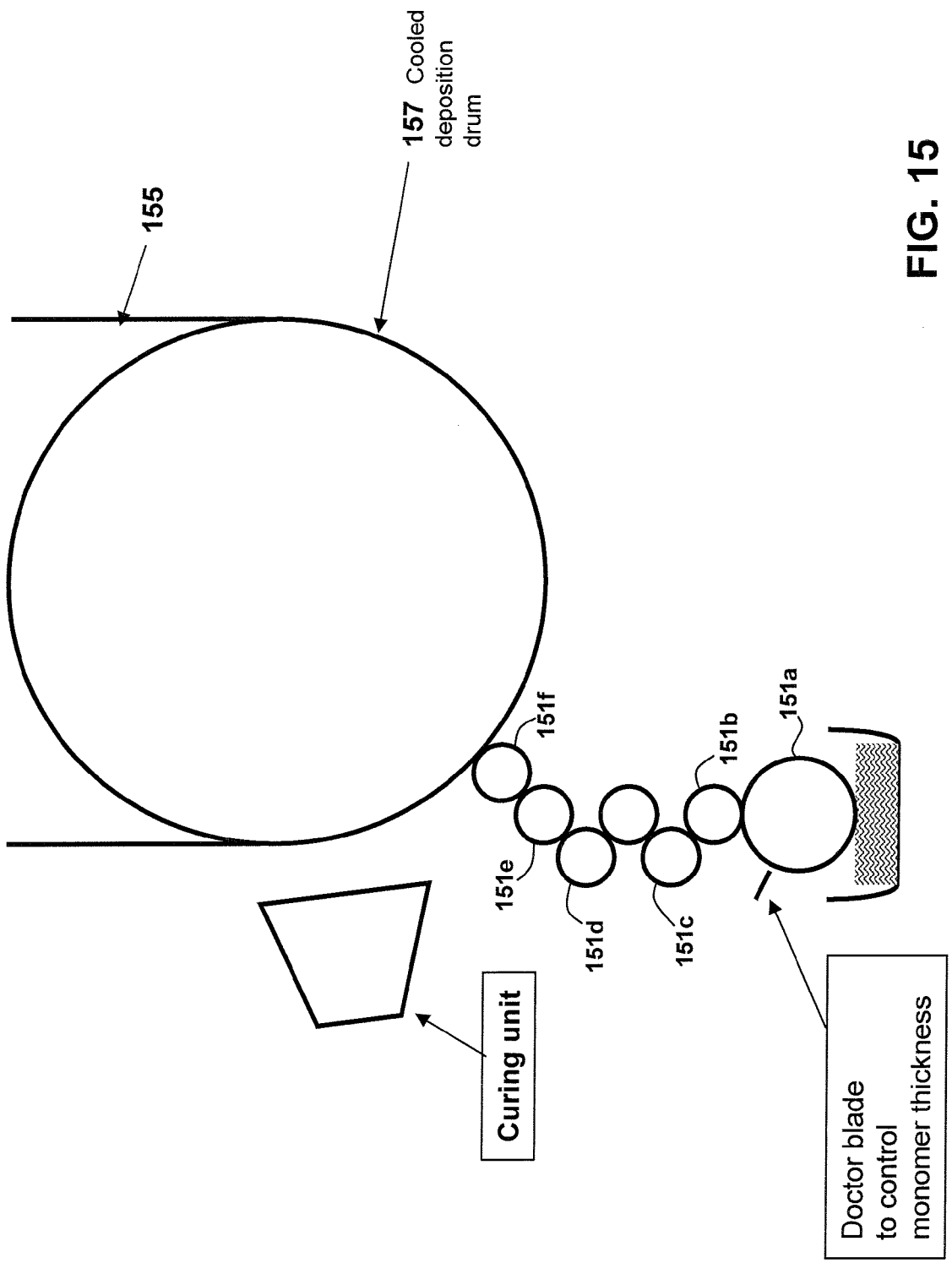
FIG. 15 is a diagram of a polymer coating station wherein a train of rollers is used to reduce the thickness of the coating monomer.

Referring now to FIG. 15, a series of rolls 151a through 151f that may be of different diameters and/or rotating at different speeds are utilized as a method of reducing the monomer loading on successive rolls to deposit a preferred amount of the monomer onto the web 155 supported by a cooled deposition drum 157. Using chilled rolls 151a through 151f would allow the use of some polymers with vapour pressures that might otherwise be too high. Alternatively using the printing style roller train as the means of taking the monomer from the bath of liquid and reducing the monomer thickness on each roll successively down to the desired thinness.

Figure 16:
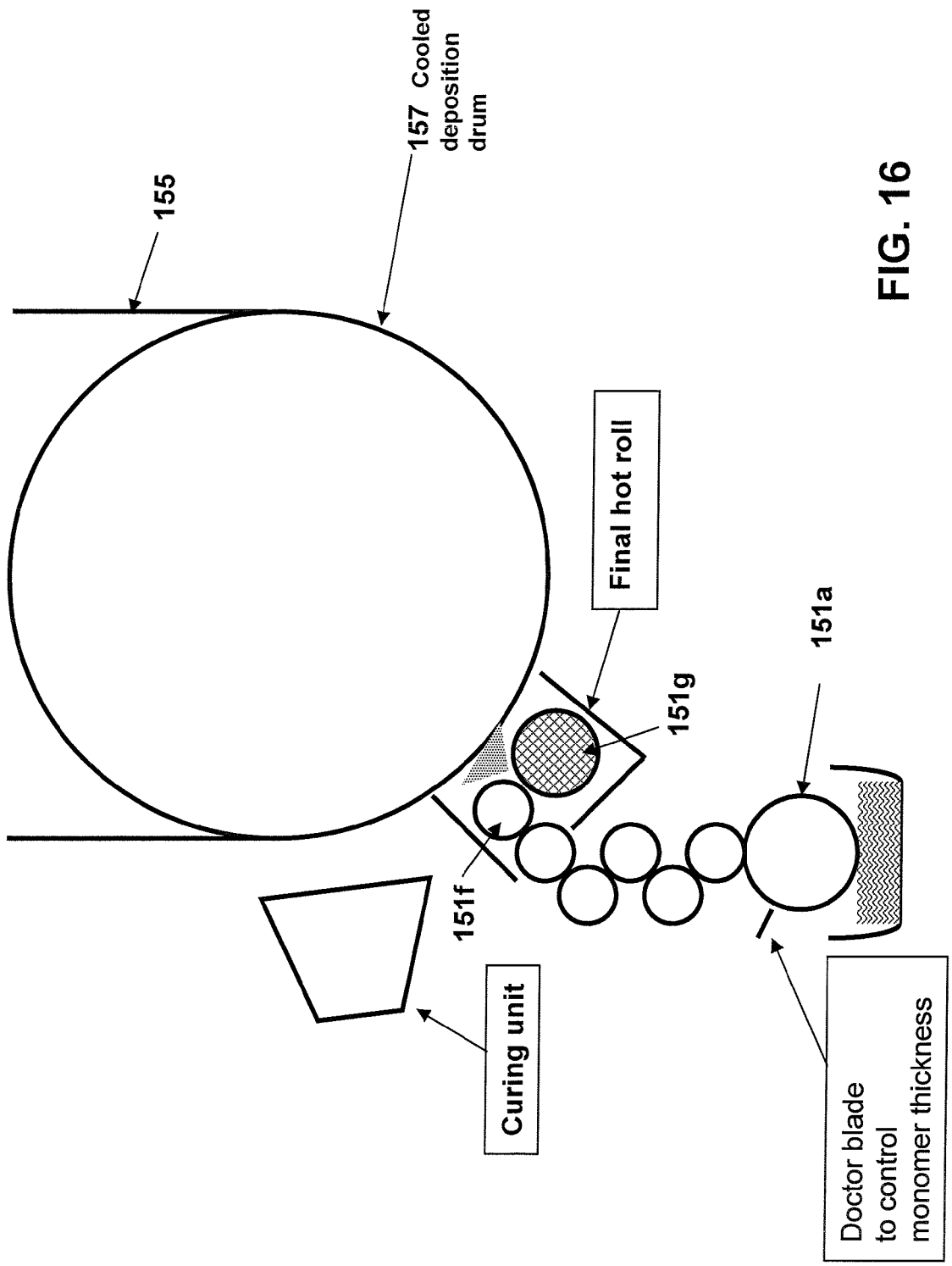
FIG. 16 is a diagram of a polymer coating station wherein a train of rollers is used to reduce the thickness of the coating monomer similar to FIG. 15, wherein a heated roll is provided to vaporize the monomer.

FIG. 16 shows an alternative embodiment to FIG. 15 wherein a last roll 151g is a heated roll that vaporizes the monomer. The vapor is then condensed onto the substrate passing by on the cooled deposition drum.

Figure 17:
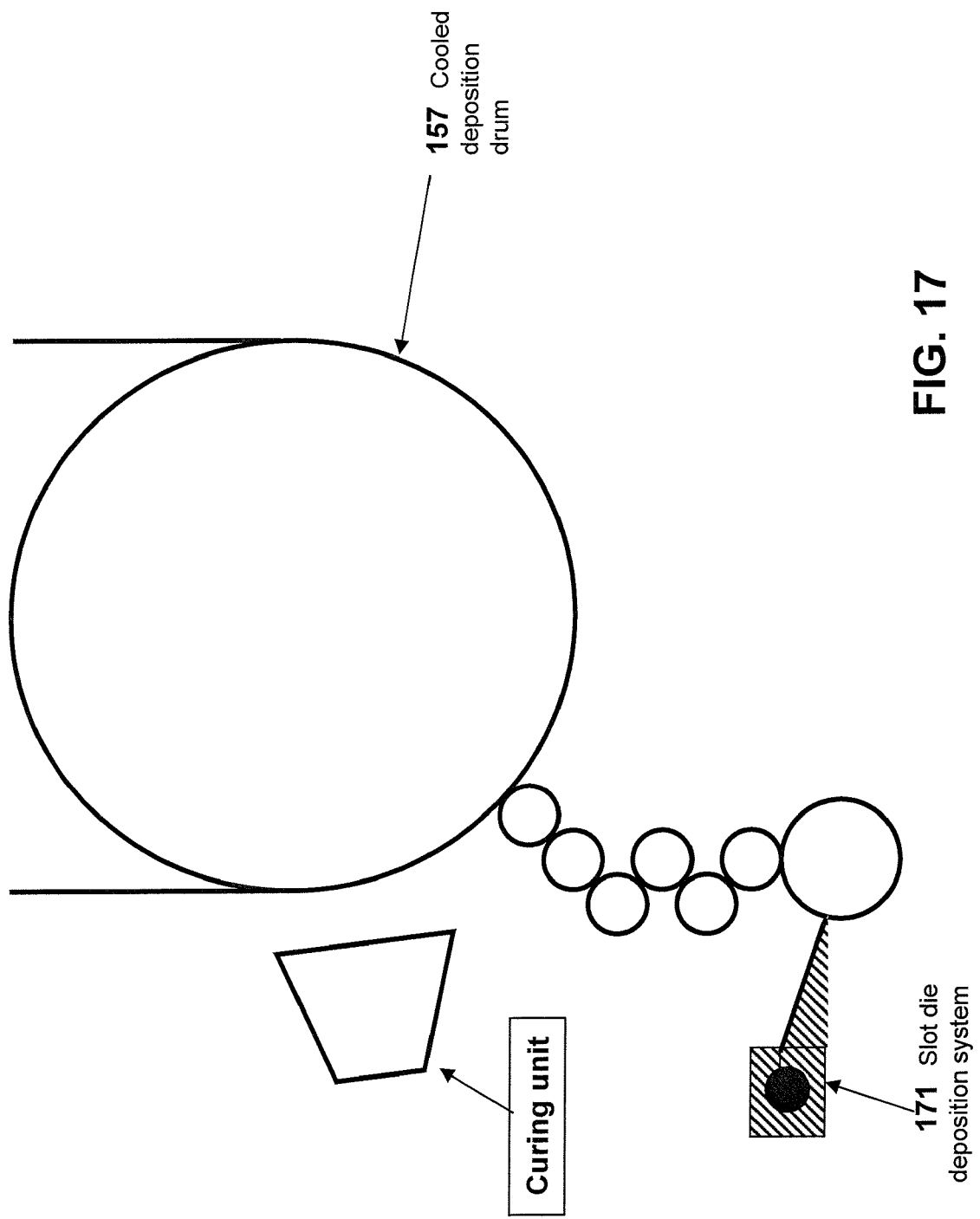
FIG. 17 is a diagram of a polymer coating station wherein a train of rollers is used to reduce the thickness of the coating monomer and wherein a slot die is provided to deposit monomer on the first roller.

FIG. 17 illustrates a third variation wherein the monomer is evaporated via a slot die coupled to the roll train to improve the uniformity before coating the web either directly or via the hot roll vaporization method.

Of course numerous other embodiments may be envisaged without departing from the spirit and scope of the invention.

What is claimed is:

1. A multilayer thin film filter having an organic dielectric layer therein, spanning a plurality of regions of the filter, wherein the dielectric layer is embossed to define the plurality of regions of different uniform thicknesses, wherein some adjacent regions of the dielectric layer have a different uniform thickness, and wherein the size of one of the embossed adjacent regions is such that the color of said one region is uniform and cannot be seen by a human eye as different in color from the uniform color of an adjacent region thereto, and wherein the color within a region can be seen with magnification of at least 10:1.

2. A multilayer thin film filter as defined in claim 1, wherein one of the multi layers is an absorber layer that is more uniform in thickness than the embossed organic dielectric layer.

3. A multilayer thin film filter as defined in claim 2, wherein one of the multi layers is a reflective layer that is more uniform in thickness than the embossed organic dielectric layer.

4. A multilayer thin film filter as defined in claim 3, wherein the reflector layer is more uniform in thickness than the absorber layer.

5. A multilayer thin film filter as defined in claim 3 further comprising a second embossed organic dielectric layer on an opposite side of the reflective layer and a second absorber layer over the second embossed organic dielectric layer.

6. A multilayer thin film filter as defined in claim 5 wherein the filter is symmetrical and wherein the reflective layer is sandwiched between the organic dielectric layer and the second organic dielectric layer and where the absorber layer and the second absorber layer cover the embossed dielectric layer and the second embossed dielectric layer respectively.

7. A multilayer thin film filter as defined in claim 1, wherein a color difference can be seen with a magnification of at least 100 times, and wherein a color difference is imperceptible with a magnification of 10 times or less.

8. A multilayer thin film filter as defined in claim 1, wherein a region of the embossed dielectric layer having a different thickness than another adjacent region is embossed with a diffraction grating therein, and wherein the average thickness of said embossed region is different than the thickness of an adjacent region.

9. A multilayer thin film filter as defined in claim 8, wherein the embossed region provides diffractive effect and color shifting effects, and wherein the adjacent region only provides color shifting effects.

10. A multilayer thin film filter as defined in claim 9, wherein the thin film filter is a chromagram.

11. A multilayer thin film filter as defined in claim 1, wherein the filter comprises a pigment flake, and wherein one of the embossed regions provides a covert security feature.

12. A multilayer thin film filter as defined in claim 11 wherein the covert security feature is in the form of indicia.

13. A multilayer thin film filter as defined in claim 1 wherein the plurality of different color regions define a coven color code that is only discernable with magnification.

14. A multilayer thin film filter as defined in claim 1, wherein a region of the embossed dielectric layer has non-sinusoidal impressions in adjacent regions and wherein the impressions form cavities with flat bottoms and wherein the cavities are below eye resolution.

15. A multilayer thin film filter as defined in claim 14, wherein cavities are square, rectangular, circular or triangular.

16. A multilayer thin film filter as defined in claim 1, wherein the plurality of different color regions differ in their color from one another by at least a $\Delta E$ value of 10.

17. A multilayer thin film filter having an organic dielectric layer therein sandwiched between an absorber and reflector layer, wherein the dielectric layer is embossed to provide a coven security information only discernible with magnification wherein the absorber layer and the reflector layer are non-embossed and have substantially a uniform thickness.

18. A multilayer thin film filter comprising:
an organic dielectric layer therein, spanning a plurality of regions of the filter, wherein the dielectric layer is embossed in at least one region to define a different thickness than in an adjacent region and wherein the embossing is of a dimension that produces an optical effect that cannot be seen by a human eye without magnification of at least 10 times;
an absorber layer covering the organic dielectric layer; and,
a reflector layer supporting the organic dielectric layer.

* * * * *

UNITED STATES PATENT AND TRADEMARK OFFICE
CERTIFICATE OF CORRECTION

| | |
|---|---|
| PATENT NO. | : 7,630,109 B2 |
| APPLICATION NO. | : 11/424033 |
| DATED | : December 8, 2009 |
| INVENTOR(S) | : Phillips et al. |

It is certified that error appears in the above-identified patent and that said Letters Patent is hereby corrected as shown below:

Col. 16, Claim 17, line 26, "coven security information" should read -- covert security information --

Col. 16, Claim 17, line 27, "tion wherein the" should read -- tion, wherein the --

Signed and Sealed this
Twenty-sixth Day of July, 2011

David J. Kappos
*Director of the United States Patent and Trademark Office*